(12) United States Patent
Kim et al.

(10) Patent No.: US 9,374,811 B2
(45) Date of Patent: Jun. 21, 2016

(54) METHOD AND APPARATUS FOR TRANSCEIVING A DOWNLINK HARQ IN A WIRELESS COMMUNICATION SYSTEM

(75) Inventors: Hyungtae Kim, Anyang-si (KR); Daewon Lee, Anyang-si (KR); Seungmin Lee, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 14/127,450

(22) PCT Filed: Jul. 6, 2012

(86) PCT No.: PCT/KR2012/005374
§ 371 (c)(1),
(2), (4) Date: Dec. 18, 2013

(87) PCT Pub. No.: WO2013/009043
PCT Pub. Date: Jan. 17, 2013

(65) Prior Publication Data
US 2014/0126512 A1 May 8, 2014

Related U.S. Application Data

(60) Provisional application No. 61/505,545, filed on Jul. 8, 2011, provisional application No. 61/508,080, filed on Jul. 15, 2011.

(51) Int. Cl.
*H04W 72/04* (2009.01)
*H04L 5/00* (2006.01)
*H04L 1/18* (2006.01)

(52) U.S. Cl.
CPC .......... *H04W 72/042* (2013.01); *H04L 1/1822* (2013.01); *H04L 5/0073* (2013.01); *H04L 1/1893* (2013.01)

(58) Field of Classification Search
None
See application file for complete search history.

(56) References Cited

U.S. PATENT DOCUMENTS

2009/0300456 A1 12/2009 Pelletier et al.
2011/0038329 A1* 2/2011 Luo et al. ............... 370/329
(Continued)

FOREIGN PATENT DOCUMENTS

WO 2010/105539 9/2010
WO 2011/008049 1/2011

OTHER PUBLICATIONS

R1-084206 (3GPP TSG RAN WG1 Meeting #55, "UL/DL band swapping for efficient support of relays in FDD mode", LG Electronics, Nov. 10-14, 2008.).*
PCT International Application No. PCT/KR2012/005374, Written Opinion of the International Searching Authority dated Jan. 17, 2013, 14 pages.

(Continued)

*Primary Examiner* — Faruk Hamza
*Assistant Examiner* — Cassandra Decker
(74) *Attorney, Agent, or Firm* — Lee, Hong, Degerman, Kang & Walmey; Jonathan Kang; Michael Monaco

(57) ABSTRACT

The present invention relates to a wireless communication system, and more particularly, to a method and apparatus for transceiving a downlink hybrid automatic repeat (HARQ). According to one embodiment of the present invention, a method for setting an HARQ process by a terminal in a wireless communication system may comprise the steps of: receiving, from a base station, limited-resource information indicating a resource the use of which for downlink transmission to the terminal is limited; determining an HARQ process to be activated on the basis of the limited-source information; and performing an HARQ operation for the downlink transmission by means of the HARQ process to be activated.

10 Claims, 17 Drawing Sheets

(56) References Cited

U.S. PATENT DOCUMENTS

| | | | |
|---|---|---|---|
| 2011/0075611 A1* | 3/2011 | Choi | 370/329 |
| 2012/0176894 A1* | 7/2012 | Cai et al. | 370/230 |
| 2013/0176981 A1* | 7/2013 | Earnshaw et al. | 370/329 |
| 2014/0010213 A1* | 1/2014 | Wang et al. | 370/336 |
| 2014/0105224 A1* | 4/2014 | Frederiksen et al. | 370/465 |
| 2014/0126530 A1* | 5/2014 | Siomina et al. | 370/330 |

OTHER PUBLICATIONS

Motorola, "HARQ termination point for CoMP joint-transmission," 3GPP TSG-RAN-WG2 Meeting #65bis, Tdoc R2-092358, Mar. 2009, 4 pages.

PCT International Application No. PCT/KR2012/005374, Written Opinion of the International Searching Authority dated Jan. 17, 2013, 11 pages.

* cited by examiner

FIG. 5
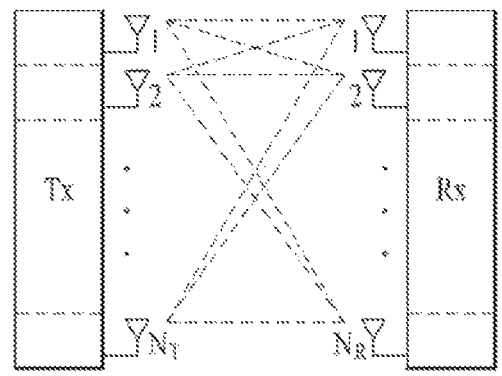
(a)
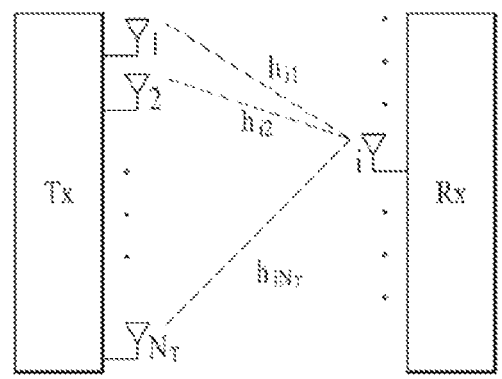
(b)

FIG. 10
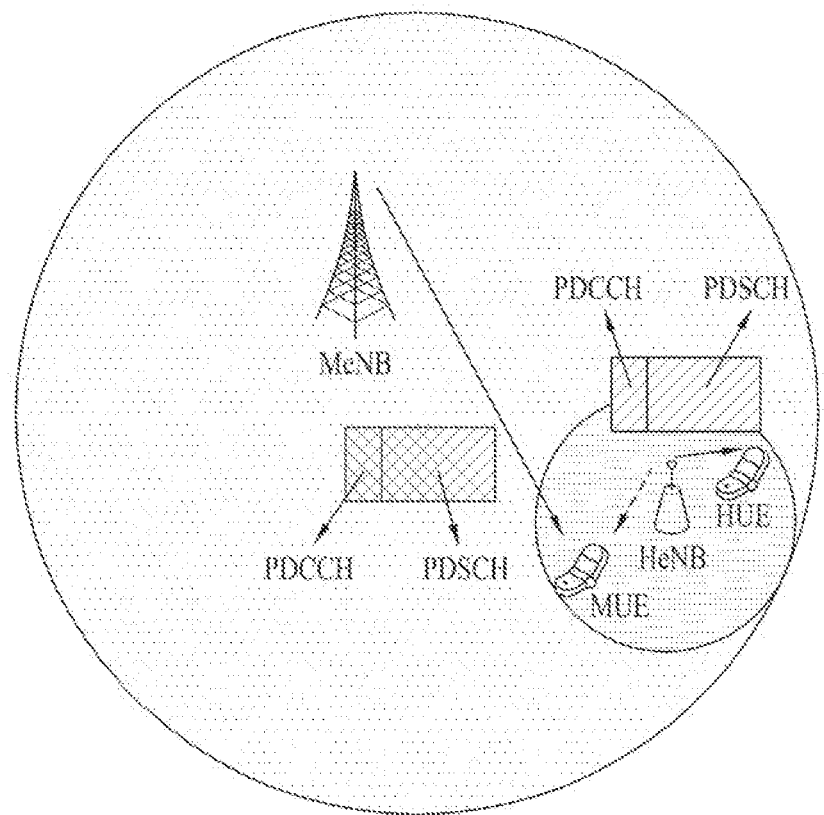
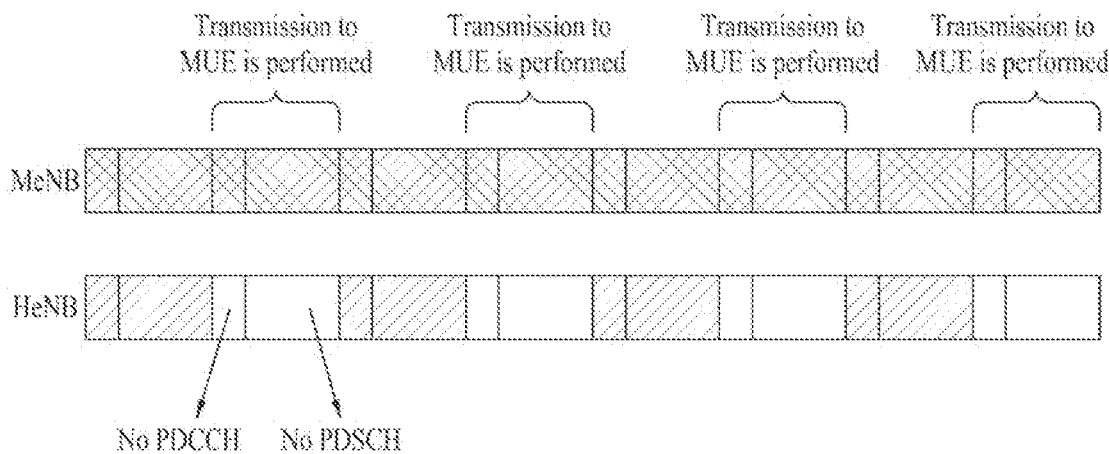

METHOD AND APPARATUS FOR TRANSCEIVING A DOWNLINK HARQ IN A WIRELESS COMMUNICATION SYSTEM

CROSS-REFERENCE TO RELATED APPLICATIONS

This application is the National Stage filing under 35 U.S.C. 371 of International Application No. PCT/KR2012/005374, filed on Jul. 6, 2012, which claims the benefit of U.S. Provisional application Ser. Nos. 61/505,545, filed on Jul. 8, 2011, and 61/508,080, filed on Jul. 15, 2011, the contents of which are all hereby incorporated by reference herein in their entirety.

FIELD OF THE INVENTION

The present invention relates to a wireless communication system, and more particularly to a method and apparatus for transmitting and receiving a downlink hybrid automatic repeat request (DL HARQ).

BACKGROUND ART

A hybrid automatic repeat request (HARQ) operation can be applied as a method for controlling data reception failure. When a data transmitter receives an ACK signal from a data receiver after transmitting a packet to the data receiver, the data transmitter can transmit a new packet. If the data transmitter receives a NACK signal from the data receiver, the data transmitter can retransmit the previously transmitted packet. In this case, a packet to which encoding according to forward error correction (FEC) has been applied can be retransmitted. Accordingly, the data receiver decodes a received packet and transmits an ACK signal upon successfully decoding the received packet. When the data receiver does not successfully decode the received packet, the data receiver transmits a NACK signal and stores the received packet in a buffer. Upon reception of a retransmitted packet according to the NACK signal, the data receiver combines the retransmitted packet with the packet stored in the buffer and decodes the combined packet to improve packet reception success rate.

A conventional wireless communication system has defined 8 independent HARQ processes for each cell. A buffer is allocated to each HARQ process. In addition, if multiple cells are configured for each user equipment (UE), 8 independent HARQ processes are configured per cell. Accordingly, assuming that N cells are configured, (8*N) HARQ processes should be configured. In addition, a buffer is configured per HARQ process. In this case, since total memory capacity of the UE is limited, memory capacity capable of being allocated to one buffer is gradually reduced as the number of configured HARQ processes and buffers increases.

DETAILED DESCRIPTION OF THE INVENTION

Technical Problem

Coordinated transmission/reception based on a plurality of cells has been discussed. In case of coordinated transmission/reception, one resource can be commonly used for data transmission from the plurality of cells. In more detail, in association with a specific cell from among coordinated cells, the independent use of resources is limited. In addition, various methods for coordinating interference between neighbor cells are being discussed. As a representative example of inter-cell interference coordination method, the use of some resources may be limited to a specific cell. In the above-mentioned cases, if separate HARQ processes for limited resources are configured, buffer capacity for the HARQ process to be actually used is reduced so that inefficiency or inaccuracy of the entire HARQ operation may occur.

An object of the present invention is to provide a method for adaptively configuring an HARQ process. In addition, the present invention adaptively configures the HARQ process according to limited resources of a wireless communication system, such that inaccuracy or inefficiency of the HARQ operation is prevented from occurring.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for configuring a hybrid automatic repeat request (HARQ) process by a user equipment (UE) in a wireless communication system including: receiving resource limitation information indicating resources that are limited using for downlink (DL) transmission toward the UE, from a base station (BS); determining an HARQ process to be activated on the basis of the resource limitation information; and performing an HARQ operation for the downlink transmission through the activated HARQ process.

In another aspect of the present invention, a user equipment (UE) for configuring a hybrid automatic repeat request (HARQ) process in a wireless communication system includes: a transmission (Tx) module configured to transmit an uplink signal to a base station (BS); a reception (Rx) module configured to receive a downlink signal from the base station (BS); and a processor configured to control the UE including the transmission (Tx) module and the reception (Rx) module, wherein the processor receives resource limitation information indicating resources that are limited using for downlink (DL) transmission toward the UE from a base station (BS) using the reception (Rx) module, determines an HARQ process to be activated on the basis of the resource limitation information, and performs an HARQ operation for the downlink transmission through the activated HARQ process.

The following description may be commonly applied to the embodiments of the present invention.

The resource limitation information may be information regarding a subframe and a frequency band that are commonly used by more than once cell when coordinated transmission is performed by the more than once cellconfigured for the UE.

The activated HARQ process may be an HARQ process commonly configured for the more than one cell.

The resource limitation information may be information regarding a subframe in which transmission (Tx) power is coordinated for inter-cell interference (ICI) coordination by a serving cell of the UE.

The subframe in which transmission (Tx) power is coordinated may be an Almost Blank Subframe (ABS).

The resource limitation information may be information regarding a subframe in which band swapping is performed.

Equal-sized buffers may be respectively allocated to the activated HARQ processes.

Alternatively, unequal-sized buffers may be respectively allocated to the activated HARQ processes.

If transmission (Tx) power or transfer rate is relatively high on resources associated with the activated HARQ process, a buffer having relatively high capacity may be allocated; and if transmission (Tx) power or transfer rate is relatively low on resources associated with the activated HARQ process, a buffer having relatively low capacity may be allocated.

The HARQ process corresponding to the resources of limited usage may be deactivated.

The resource limitation information may further include at least one of information for identifying the activated HARQ process, information regarding the number of the activated HARQ processes, and buffer capacity allocated to each of the activated HARQ processes.

It is to be understood that both the foregoing general description and the following detailed description of the present invention are exemplary and explanatory and are intended to provide further explanation of the invention as claimed.

Effects of the Invention

As is apparent from the above description, the embodiments of the present invention can adaptively configure the HARQ process, such that the HARQ operation can be accurately and efficiently carried out.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram illustrating a wireless communication system including multiple antennas.

FIG. 10 is a conceptual diagram illustrating exemplary inter-cell interference coordination.

BEST MODE FOR CARRYING OUT THE INVENTION

Figure 1:
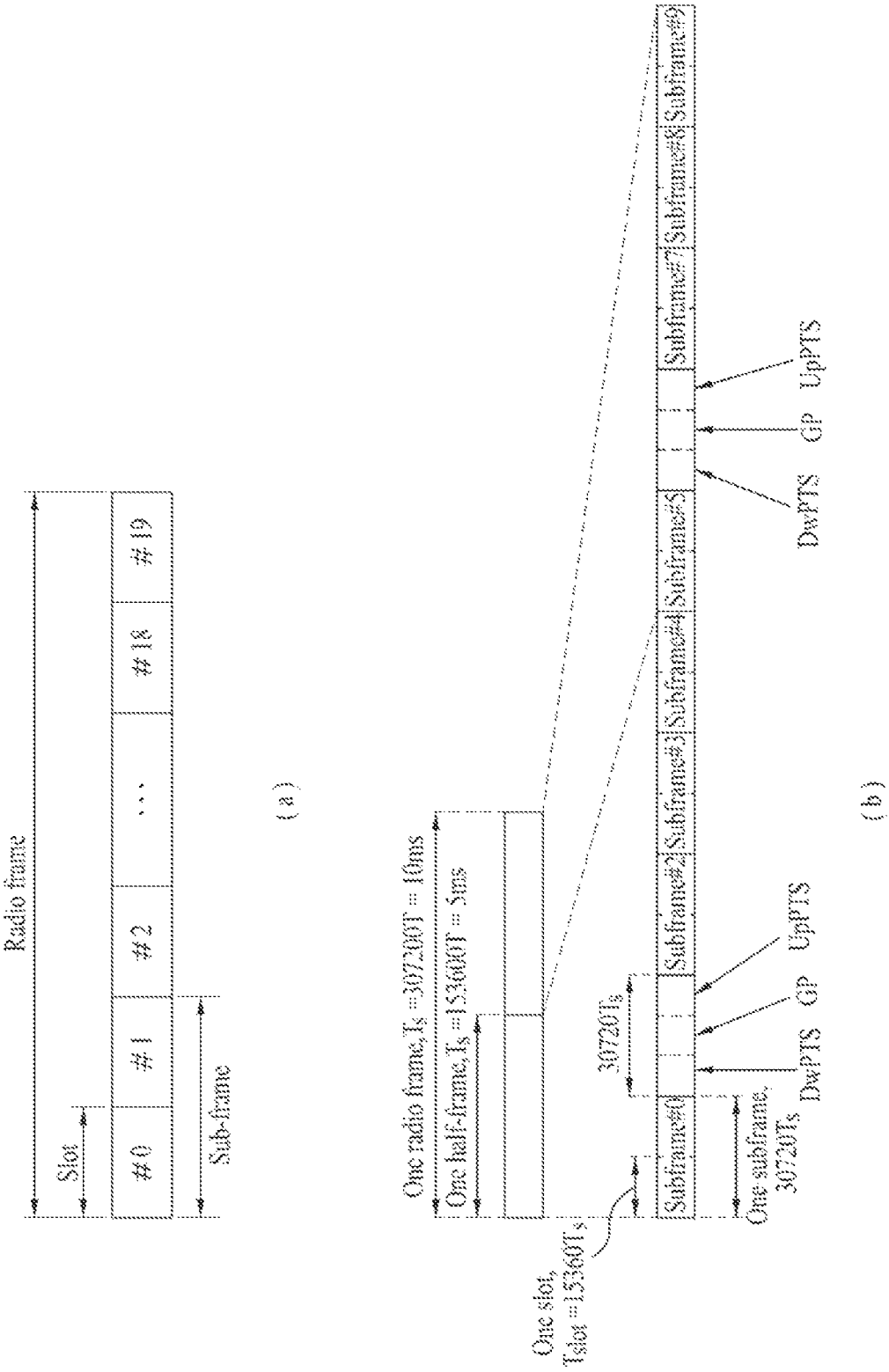
FIG. 1 exemplarily shows a radio frame structure.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal In this case, the base station is used as a terminal node of a network via which the base station can directly communicate with the terminal Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

A radio frame structure will now be described with reference to FIG. 1.

In a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CP. In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 1(b) illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The aforementioned radio frame structure is purely exemplary and thus the number of subframes included in a radio frame, the number of slots included in a subframe, or the number of symbols included in a slot may vary.

Figure 2:
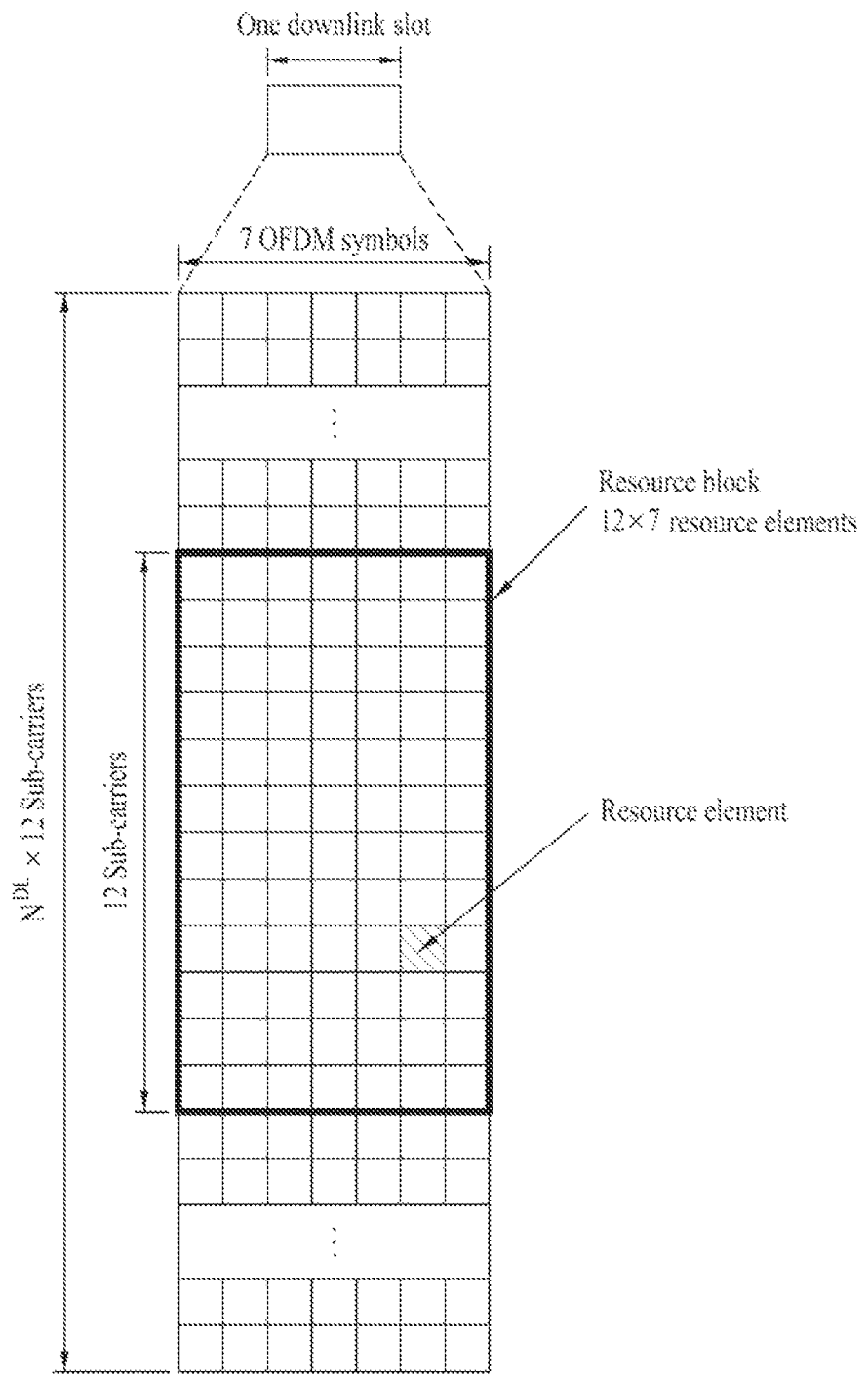
FIG. 2 exemplarily shows a resource grid of a downlink slot.

FIG. 2 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12x7 REs. The number of RBs in a downlink slot, $N^{DL}$ depends on a downlink transmission bandwidth. An uplink slot may have the same structure as a downlink slot.

Figure 3:
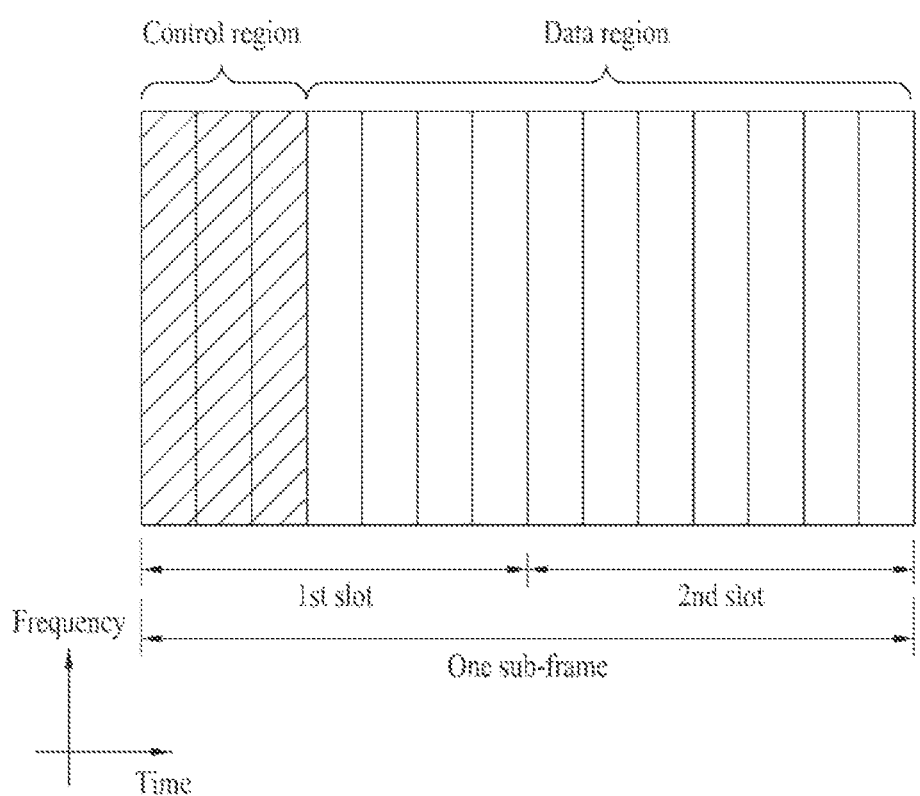
FIG. 3 exemplarily shows a downlink subframe structure.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
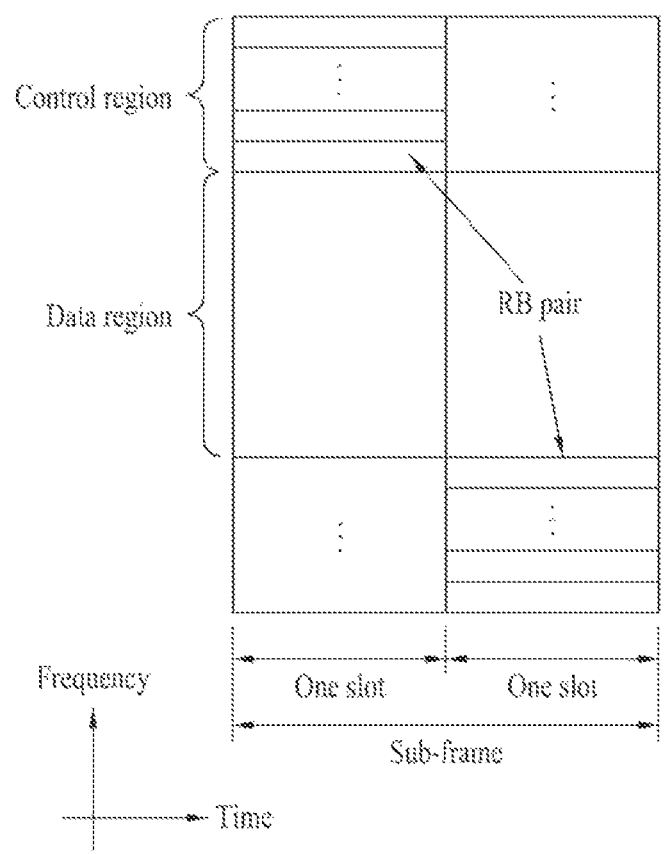
FIG. 4 exemplarily shows an uplink subframe structure.

FIG. 4 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

MIMO System Modeling

FIG. 5 illustrates the configuration of a communication system including multiple antennas.

Referring to FIG. 5(a), when both the number of Tx antennas and the number of Rx antennas respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate R, illustrated in Equation 1 due to an increase in channel transmission capacity in case of multiple antennas.

$$R_i = \min(N_T N_R) \quad \text{[Equation 1]}$$

For instance, a MIMO communication system with 4 Tx antennas and 4 Rx antennas may achieve a four-fold increase in transmission rate theoretically, relative to a single-antenna system. The theoretical increase in transmission rate of MIMO communication was demonstrated in the mid-1990s, various technologies for improving data rate have been actively studied since then and are now employed in various wireless communication standards such as $3^{rd}$ generation mobile communication and next-generation wireless LAN.

A variety of research such as information theory research related to calculation of multi-antenna throughput in various channel environments and multiple access environments, research on radio channel measurement and model derivation in MIMO systems and research on time spatial signal processing technology for improvement of transmission reliability and data rate are underway.

Communication in a MIMO system will be described in detail through mathematical modeling. It is assumed that $N_T$ Tx antennas and $N_R$ Rx antennas are present.

Regarding a transmission signal, up to $N_T$ pieces of information can be transmitted through the $N_T$ Tx antennas, as expressed as the following vector.

$$s = [s_1, s_2, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as follows.

$$\hat{s} = [\hat{s}_1, \hat{s}_2, \ldots, \hat{s}_{N_T}]^T = [Ps_1, Ps_2, \ldots, Ps_{N_T}]^T \quad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{12} & w_{12} & \cdots & w_{2N_T} \\ \vdots & & \ddots & \\ w_{i2} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Herein, $w_{ij}$ denotes a weight between an $i^{th}$ Tx antenna and a $j^{th}$ piece of information. W is called a weight matrix or a precoding matrix.

Given $N_R$ Rx antennas, signals received at the respective Rx antennas, $y_1, y_2, \ldots y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an $i^{th}$ Rx antenna. The channels may be represented as vectors and matrices by grouping them. As illustrated in FIG. 5(b), the channels from the $N_T$ Tx antennas to an $i^{th}$ Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{[Equation 10]}$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

In general, the rank of a matrix is defined as the smaller between the numbers of independent rows and columns. Accordingly, the rank of the matrix is not larger than the number of rows or columns. The rank of the matrix H, rank (H) is limited as follows.

$$\text{rank}(H) \leq \min(N_T, N_R)$$

The rank of a matrix may be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix can be a maximum number of channels through which different pieces of information can be transmitted.

In the specification, 'rank' with respect to MIMO transmission represents the number of paths through which signals can be independently transmitted in a specific frequency resource at a specific instance and 'number of layers' refers to the number of signal streams transmitted through each path. Since a transmitter transmits as many layers as the number of ranks used for signal transmission, the rank corresponds to the number of layers unless otherwise mentioned.

Coordinated Multi-Point: CoMP

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

A UE can receive data from multi-cell base stations collaboratively using the CoMP system. The base stations can simultaneously support one or more UEs using the same radio frequency resource, improving system performance. Furthermore, a base station may perform space division multiple access (SDMA) on the basis of CSI between the base station and a UE.

In the CoMP system, a serving eNB and one or more collaborative eNBs are connected to a scheduler through a backbone network. The scheduler can operate by receiving channel information about a channel state between each UE and each collaborative eNB, measured by each eNB, through the backbone network. For example, the scheduler can schedule information for collaborative MIMO operation for the serving eNB and one or more collaborative eNBs. That is, the scheduler can directly direct collaborative MIMO operation to each eNB.

As described above, the CoMP system can be regarded as a virtual MIMO system using a group of a plurality of cells. Basically, a communication scheme of MIMO using multiple antennas can be applied to CoMP.

Automatic Repeat reQuest (ARQ)

A BS or eNB (cell or sector) for use in a mobile communication system may communicate with a plurality of UEs under a wireless channel environment. In case of DL Tx/Rx, the BS may transmit data received from a network to each UE using a predetermined communication scheme. DL scheduling (or DL assignment) may indicate which UE will receive data from the BS through certain resources (corresponding to any one of time, frequency, and spatial resources) to be used by the BS. In case of UL Tx/Rx, the BS may receive and demodulate data transmitted from the UE using a predetermined communication scheme, and then transmit the demodulated result to the network. UL scheduling (or UL grant) may indicate which UE will receive UL data from the BS using certain resources (corresponding to any one of time, frequency, and spatial resources). Generally, a UE having a good channel condition may be scheduled to perform data communication using much more time and frequency resources.

In case of UL/DL data transmission/reception, unexpected errors may occur in Tx data according to a channel environment or the like. As an exemplary error correction method, the ARQ scheme or more evolved HARQ scheme may be used. In accordance with the ARQ scheme, the transmitter transmits data of one unit and then waits for receiving an ACK or NACK message in response to the transmitted data. If the data has been correctly decoded, the receiver feeds back the ACK message to the transmission end. If there arises any error in the data, the receiver may feed back the NACK message to the transmitter, and erroneous data is then deleted from a buffer of the receiver. Upon receiving the ACK message from the transmitter, the receiver transmits new data. Upon receiving the NACK message from the transmitter, the receiver may retransmit previous data. In accordance with the HARQ scheme, if data received by the receiver has been wrongly decoded, the receiver may feed back the NACK message to the transmitter, store legacy reception data (i.e., incorrectly decoded data) in the buffer during a predetermined time, and combine the stored data with data retransmitted by the transmitter, such that the receiver may reattempt to decode the resultant reception data. As a result, a reception success rate can be increased using the HARQ scheme.

The HARQ scheme may be classified into a synchronous scheme and an asynchronous scheme on the basis of a retransmission time, and may also be classified into an adaptive scheme and a non-adaptive scheme according to whether a changed channel state is applied to the amount of resources used for retransmission.

In accordance with the synchronous HARQ scheme, if initial transmission failure occurs, subsequent retransmission may be carried out at a specific time decided by the system. For example, assuming that retransmission is scheduled at intervals of n (e.g., n=4) time units (e.g., n subframes) upon completion of the initial transmission failure, the transmitter need not inform the receiver of information regarding the retransmission time. Accordingly, upon receiving the NACK signal from the data transmitter, the receiver may retransmit a packet at every n-th time unit before receiving the ACK signal. On the contrary, according to the asynchronous HARQ scheme, information regarding the retransmission time may be scheduled separately. Therefore, the retransmission time of the packet corresponding to the NACK signal may be changed by various conditions such as a channel state, etc.

In accordance with the non-adaptive HARQ scheme, the modulation and coding scheme (MCS) level of the retransmitted packet, the number of used resource blocks (RBs), and the like, may be achieved as defined in initial transmission. For example, assuming that the transmitter transmits data using 8 resource blocks (RBs) during initial transmission, the 8 RBs may also be retransmitted during retransmission. In the meantime, the adaptive scheme may change the packet modulation scheme and the number of RBs according to a channel state. For example, even when data is transmitted using 8 RBs, the data may be retransmitted using a higher or less number of RBs than 8 RBs.

Although four HARQ schemes may be defined according to the aforementioned classification, the asynchronous and channel adaptive HARQ scheme and the synchronous channel non-adaptive HARQ scheme may be mainly used. The asynchronous and channel adaptive HARQ scheme may adaptively change a retransmission time and the amount of used resources according to a channel state, such that retransmission efficiency can be maximized but overhead unavoidably increases. Meanwhile, according to the synchronous and channel non-adaptive HARQ scheme, the retransmission time and resource assignment have been promised in the system, such that there is little overhead requisite for the retransmission time and resource assignment. However, if the synchronous and channel non-adaptive HARQ scheme is used in a channel of a high variable range, retransmission efficiency is decreased.

Figure 6:
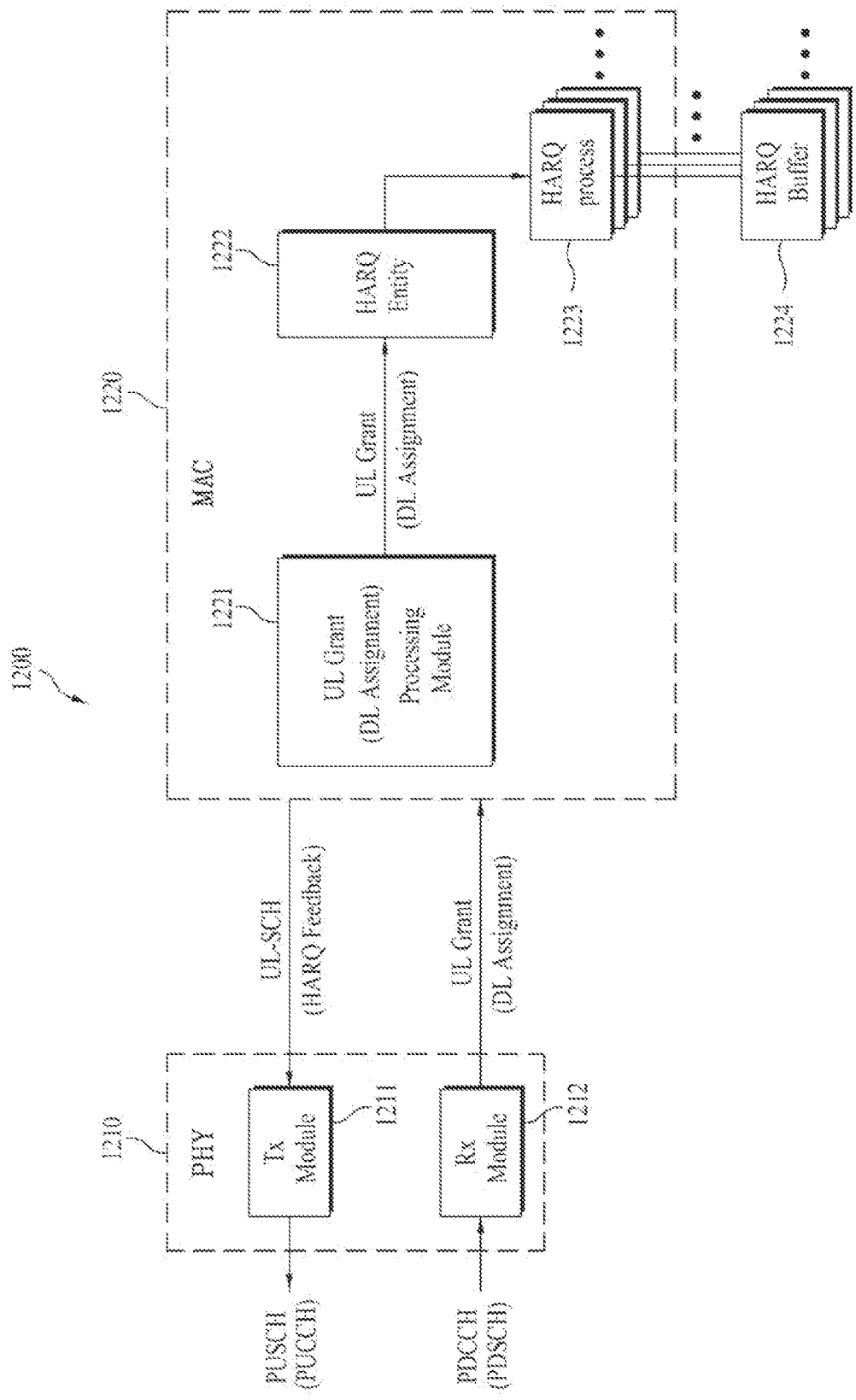
FIG. 6 is a block diagram illustrating a user equipment (UE) applicable to embodiments of the present invention.

FIG. 6 is a block diagram of a UE device according to an embodiment of the present invention. The UE device may include an antenna (not shown) for transmission and reception of signals, a memory (not shown) for storing data and information, and a processor 1200 for processing transmitted and received signals. FIG. 6 shows the internal configuration of the processor 1200 for processing Tx/Rx signals and UE operations.

The processor 1200 may be divided into a physical layer module 1210 for transmitting/receiving physical signals to/from an eNB and a MAC layer module 1220 for connecting the physical layer module 1210 to a higher layer (not shown) and controlling signal transmission and reception of the physical layer module 1210.

Specifically, the physical layer module 12100 may include a transmission module 1211 for transmitting a UL signal to the eNB and a reception module 1212 for receiving a signal from the eNB. The MAC layer module 1220 may include a processing module 1221 for processing a UL grant signal and DL assignment signal, a HARQ entity 1222 for managing a HARQ operation, and a plurality of HARQ processes 1223. One HARQ entity 1222 may be assigned to a plurality of parallel HARQ processes 1223. An HARQ process ID is given per HARQ process 1223. The plurality of HARQ processes 1223 may include HARQ buffers 1224 respectively corresponding thereto. If the MAC layer module 1220 is designed to execute functions of the UL grant processing module/DL assignment processing module 1221 shown in FIG. 6, it is not necessary to configure the UL grant processing module/DL assignment processing module 1221 as a separate module.

In UL HARQ operations, the UE has a buffer capable of storing Tx data, but this buffer may be managed in different ways according to control signals from the BS or eNB. If the UE receives a UL grant signal, previous Tx data is flushed from the buffer, and the buffer is filled with new data to be transmitted according to a UL grant. If the UE receives a NACK signal from the BS in response to previous Tx data, the previous Tx data should be retransmitted, such that data stored in the buffer remains unchanged. Even when the UE receives the ACK signal from the BS in response to the previous Tx data, the data stored in the buffer remains unchanged. As a result, although the UE does not receive the NACK signal from the BS or the UE mistakes the NACK signal for the ACK signal due to the decoding error, data stored in the buffer is prohibited from being flushed.

In addition, detailed structures of other transceivers (e.g., a relay device, a BS (or eNB) device, etc.) configured to perform the HARQ operation may be substantially identical to the processor 1200 of FIG. 6 as necessary. The overall configuration of the processors of the UE or the transceiver may be implemented such that above described various embodiments of the present invention may be independently applied or two or more embodiments thereof may be simultaneously applied and a repeated description is omitted for clarity.

The above-described embodiments may be implemented by various means, for example, by hardware, firmware, software, or a combination thereof In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Figure 7:
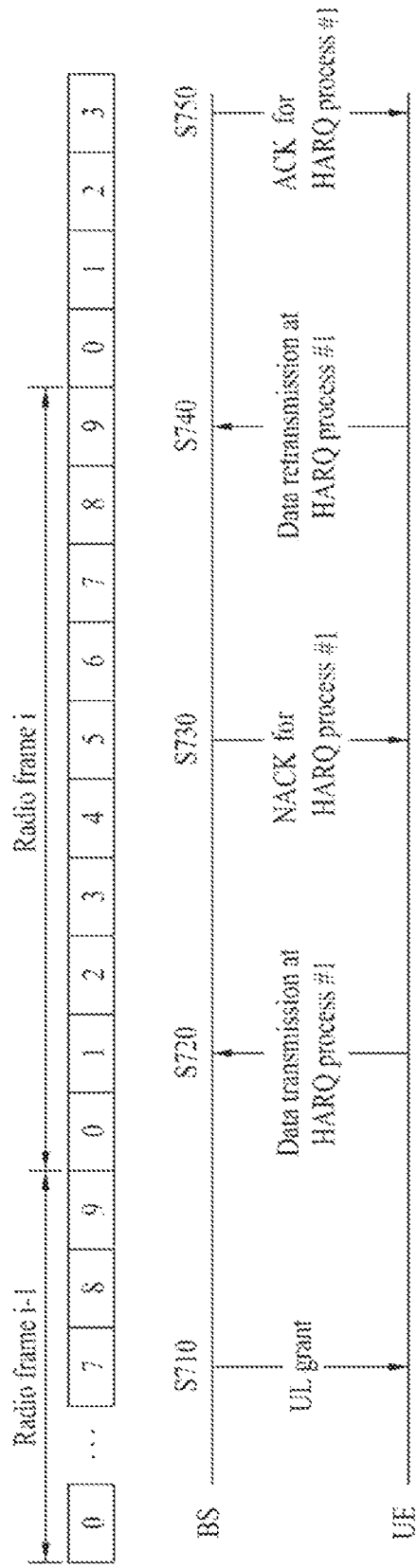
FIG. 7 is a conceptual diagram illustrating an exemplary synchronous non-adaptive UL HARQ operation.

FIG. 7 is a conceptual diagram illustrating an exemplary synchronous non-adaptive UL HARQ operation.

Referring to FIG. 7, a user equipment (UE) has a plurality of HARQ processes, and the HARQ processes may operate in a synchronous manner. That is, each HARQ process may be allocated to each TTI in a synchronous manner. For example, the LTE system assumes that the UE has 8 HARQ processes. As a result, HARQ process #1 may be allocated to the first TTI, HARQ process #2 may be allocated to the second TTI, ... HARQ process #8 may be allocated to the $8^{th}$ TTI, HARQ process #1 may be allocated to a 9th TTI, and HARQ process #2 may be allocated to the $10^{th}$ TTI. For example, if a PDCCH including a UL grant is detected at a specific TTI, the HARQ entity can identify the HARQ process in which data transmission should be carried out, and can transfer UL grant information to the identified HARQ process. For example, as can be seen from FIG. 7, if the HARQ process associated with Subframe #7 of a radio frame (i-1) having received the UL grant is set to 1, UL data may be transmitted at HARQ process #1 at Subframe #1 of the radio frame (i) and may be retransmitted at HARQ process #1 at Subframe #9 of the radio frame (i) after lapse of 8 subframes. In a synchronous HARQ operation, if the HARQ process associated with one TTI is identified, it can be recognized that the same HARQ process is associated at the corresponding TTI (TTI+8). If a certain HARQ process is associated with one TTI during the synchronous HARQ operation unless otherwise mentioned, it is assumed that the same HARQ process is associated with the $8^{th}$, $16^{th}$, and $24^{th}$ TTIs after lapse of the corresponding TTI.

In step S710, the BS (or eNB) may transmit a UL grant to the UE, such that the UE may flush a Tx buffer and store new UL data in the Tx buffer. In step S720, the UE may transmit UL data to the BS (or eNB) at HARQ process #1 on the basis of resources and MCS information in response to the UL grant received at step S710. In this example, it is assumed that UL data received by the BS (or eNB) fails in decoding, such that the BS (or eNB) may transmit the NACK message in response to UL data in step S730. Upon receiving the NACK message from the BS (or eNB), the UE may retransmit the previously transmitted UL data in step S740. In this case, retransmission may be carried out at HARQ process #1 in which UL data transmission has been carried out at step S720, and the retransmission may be carried out at intervals of 8 msec. That is, a time point at which retransmission is carried out is not separately designated, and the retransmission is carried out at intervals of a predetermined time, such that this operation may correspond to a synchronous HARQ operation. In addition, the UE having received the NACK message may apply resources, MCS level, etc. designated by the previously received UL grant to retransmission without change, without receiving a separated UL grant. That is, new scheduling information for retransmission is not given, and may correspond to the non-adaptive HARQ operation. The BS having received the retransmitted UL data combines the retransmitted UL data with the previously received data, and attempts to decode the combined result. In this example, it is assumed that the BS succeeds in reception and decoding of UL data. In this case, the BS may transmit the ACK message to the UE in step S750. Although FIG. 7 assumes a uplink (UL) situation in which the UE is a data transmitter, the BS is a data receiver, and the UE receives HARQ feedback information from the UE for convenience of description and better understanding of the present invention, the HARQ operation may be carried out even in the case in which the BS transmits DL data and the UE feeds back ACK/NACK information.

Carrier Aggregation

Figure 8:
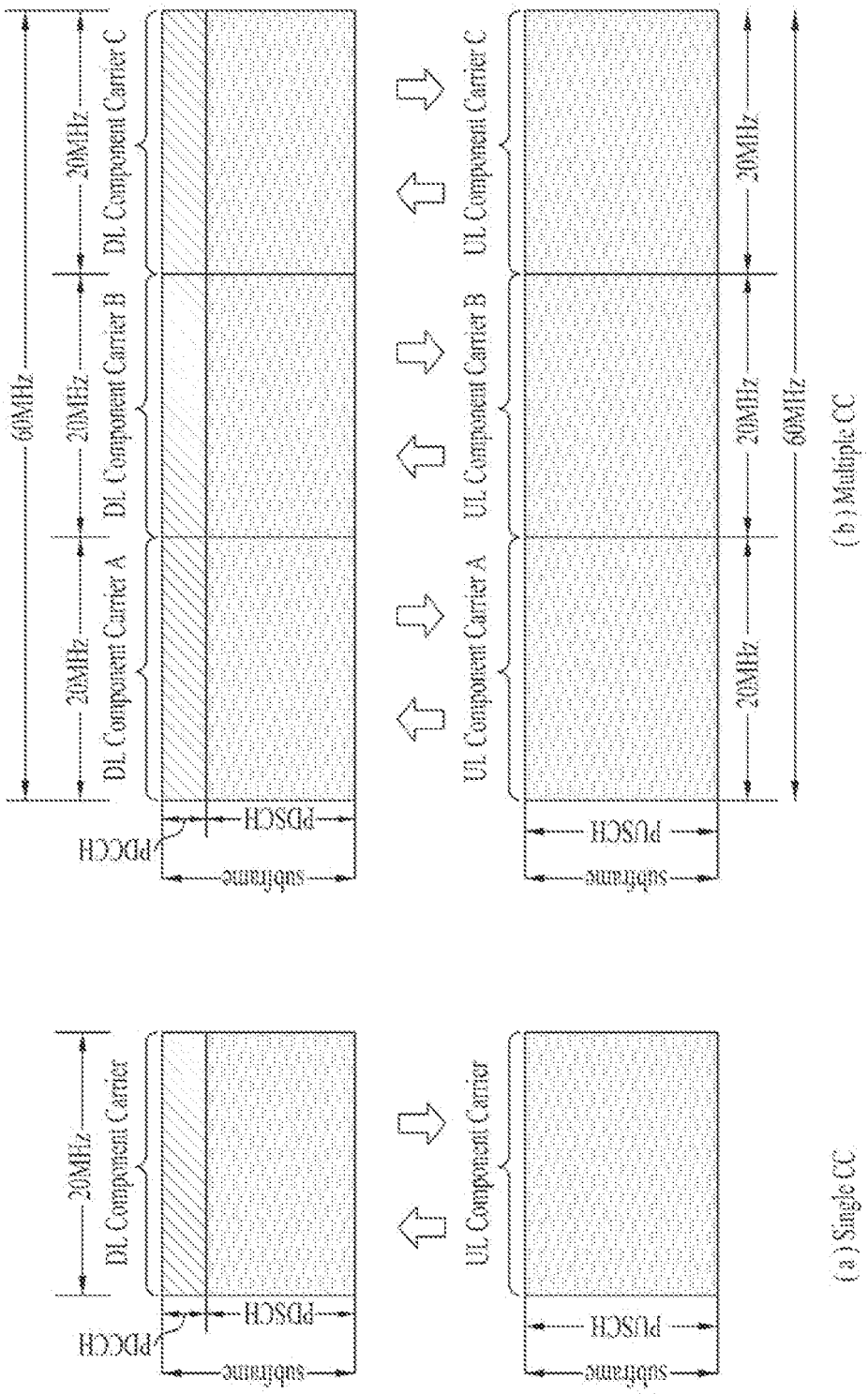
FIG. 8 is a conceptual diagram illustrating a carrier aggregation (CA) scheme.

FIG. 8 is a diagram illustrating carrier aggregation (CA). The concept of a cell, which is introduced to manage radio resources in LTE-A is described prior to the CA. A cell may be regarded as a combination of downlink resources and uplink resources. The uplink resources are not essential elements, and thus the cell may be composed of the downlink resources only or both the downlink resources and uplink resources. This is defined in LTE-A release 10, and the cell may be composed of the uplink resources only. The downlink resources may be referred to as downlink component carriers and the uplink resources may be referred to as uplink component carriers. A downlink component carrier (DL CC) and a uplink component carrier (UL CC) may be represented by carrier frequencies. A carrier frequency means a center frequency in a cell.

Cells may be divided into a primary cell (PCell) operating at a primary frequency and a secondary cell (SCell) operating at a secondary frequency. The PCell and SCell may be collectively referred to as serving cells. The PCell may be designated during an initial connection establishment, connection re-establishment or handover procedure of a UE. That is, the PCell may be regarded as a main cell relating to control in a CA environment. A UE may be allocated a PUCCH and transmit the PUCCH in the PCell thereof. The SCell may be configured after radio resource control (RRC) connection establishment and used to provide additional radio resources. Serving cells other than the PCell in a CA environment may be regarded as SCells. For a UE in an RRC_connected state for which CA is not established or a UE that does not support CA, only one serving cell composed of the PCell is present. For a UE in the RRC-connected state for which CA is established, one or more serving cells are present and the serving cells include a PCell and SCells. For a UE that supports CA, a network may configure one or more SCells in addition to a PCell initially configured during connection establishment after initial security activation is initiated.

CA is described with reference to FIG. 8. CA is a technology introduced to use a wider band to meet demands for a high transmission rate. CA can be defined as aggregation of two or more component carriers (CCs) having different carrier frequencies. FIG. 8(a) shows a subframe when a conventional LTE system uses a single CC and FIG. 8(b) shows a subframe when CA is used. In FIG. 8(b), 3 CCs each having 20 MHz are used to support a bandwidth of 60 MHz. The CCs may be contiguous or non-contiguous.

A UE may simultaneously receive and monitor downlink data through a plurality of DL CCs. Linkage between a DL CC and a UL CC may be indicated by system information. DL CC/UL CC linkage may be fixed to a system or semi-statically configured. Even when a system bandwidth is configured of N CCs, a frequency bandwidth that can be monitored/received by a specific UE may be limited to M (<N) CCs. Various parameters for CA may be configured cell-specifically, UE group-specifically, or UE-specifically.

Figure 9:
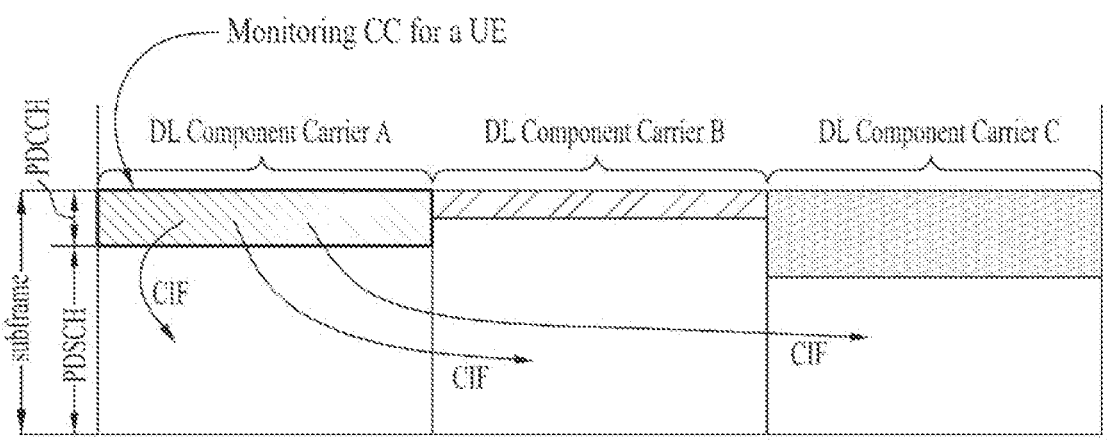
FIG. 9 is a conceptual diagram illustrating a cross-carrier scheduling scheme.

FIG. 9 is a diagram illustrating cross-carrier scheduling. Cross carrier scheduling is a scheme by which a control region of one of DL CCs of a plurality of serving cells includes downlink scheduling allocation information the other DL CCs or a scheme by which a control region of one of DL CCs of a plurality of serving cells includes uplink scheduling grant information about a plurality of UL CCs linked with the DL CC.

A carrier indicator field (CIF) is described first.

The CIF may be included in a DCI format transmitted through a PDCCH or not. When the CIF is included in the DCI format, this represents that cross carrier scheduling is applied. When cross carrier scheduling is not applied, downlink scheduling allocation information is valid on a DL CC currently carrying the downlink scheduling allocation information. Uplink scheduling grant is valid on a UL CC linked with a DL CC carrying downlink scheduling allocation information.

When cross carrier scheduling is applied, the CIF indicates a CC associated with downlink scheduling allocation information transmitted on a DL CC through a PDCCH. For example, referring to FIG. 9, downlink allocation information for DL CC B and DL CC C, that is, information about PDSCH resources is transmitted through a PDCCH in a control region of DL CC A. A UE can recognize PDSCH resource regions and the corresponding CCs through the CIF by monitoring DL CC A.

Whether or not the CIF is included in a PDCCH may be semi-statically set and UE-specifically enabled according to higher layer signaling.

When the CIF is disabled, a PDCCH on a specific DL CC may allocate a PDSCH resource on the same DL CC and assign a PUSCH resource on a UL CC linked with the specific DL CC. In this case, the same coding scheme, CCE based resource mapping and DCI formats as those used for the conventional PDCCH structure are applicable.

When the CIF is enabled, a PDCCH on a specific DL CC may allocate a PDSCH/PUSCH resource on a DL/UL CC indicated by the CIF from among aggregated CCs. In this case, the CIF can be additionally defined in existing PDCCH DCI formats. The CIF may be defined as a field having a fixed length of 3 bits, or a CIF position may be fixed irrespective of DCI format size. In this case, the same coding scheme, CCE based resource mapping and DCI formats as those used for the conventional PDCCH structure are applicable.

Even when the CIF is present, an eNB can allocate a DL CC set through which a PDCCH is monitored. Accordingly, blinding decoding overhead of a UE can be reduced. A PDCCH monitoring CC set is part of aggregated DL CCs and a UE can perform PDCCH detection/decoding in the CC set only. That is, the eNB can transmit the PDCCH only on the PDCCH monitoring CC set in order to schedule a PDSCH/PUSCH for the UE. The PDCCH monitoring DL CC set may be configured UE-specifically, UE group-specifically or cell-specifically. For example, when 3 DL CCs are aggregated as shown in FIG. 9, DL CC A can be configured as a PDCCH monitoring DL CC. When the CIF is disabled, a PDCCH on each DL CC can schedule only the PDSCH on DL CC A. When the CIF is enabled, the PDCCH on DL CC A can schedule PDSCHs in other DL CCs as well as the PDSCH in DL CC A. When DL CC A is set as a PDCCH monitoring CC, DL CC B and DL CC C do not transmit PDSCHs.

In a system to which the aforementioned CA is applied, a UE can receive a plurality of PDSCHs through a plurality of downlink carriers. In this case, the UE should transmit ACK/NACK for data on a UL CC in a subframe. When a plurality of ACK/NACK signals is transmitted in a subframe using PUCCH format 1a/1b, high transmit power is needed, a PAPR of uplink transmission increases and a transmission distance of the UE from the eNB may decrease due to inefficient use of a transmit power amplifier. To transmit a plurality of ACK/NACK signals through a PUCCH, ACK/NACK bundling or ACK/NACK multiplexing may be employed.

There may be generated a case in which ACK/NACK information for a large amount of downlink data according to application of CA and/or a large amount of downlink data transmitted in a plurality of DL subframes in a TDD system needs to be transmitted through a PUCCH in a subframe. In this case, new methods (e.g., PUCCH format 3, etc.) for transmitting ACK/NACK information can be used when the number of ACK/NACK bits to be transmitted is greater than the number of ACK/NACK bits that can be supported by ACK/NACK bundling or multiplexing.

Inter-Cell Interference Coordination

Interference between the neighbor cells may encounter the problem in a wireless network environment including a plurality of cells. Inter-Cell Interference Coordination (ICIC) may be used to solve the above inter-cell interference problem. Legacy ICIC may also be applied to frequency or time resources as necessary.

In accordance with the 3GPP LTE Release-8 system as an example of ICIC of the frequency resources, a given total frequency region (for example, a system bandwidth) is divided into one or more sub-regions (e.g., PRB units), and a method for exchanging the ICIC message of each frequency sub-region between the cells has been defined. For example, as information contained in the ICIC message of frequency resources, Relative Narrowband Transmission Power (RNTP) associated with DL Tx power has been defined, and UL Interference Overhead Indication (UL MI) and UL High Interference Indication (UL HII) associated with UL interference have been defined.

On the other hand, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of the silencing operation, a specific cell may configure a specific subframe as a Multicast-Broadcast Single Frequency Network (MBSFN) subframe. In a downlink subframe configured as the MBSFN subframe, a signal is transmitted only in a control region and is not transmitted in a data region. As another example of the silencing operation, a cell causing interference may configure a specific frame as a specific Almost Blank Subframe (ABS) or an ABS-with-MBSFN. The ABS refers to a subframe in which only a CRS is transmitted in a control region and a data region of a downlink subframe and the remaining control information and data other than the CRS are not transmitted in the control and data regions of the downlink subframe. If necessary, signals are transmitted at no power or low power in the subframe corresponding to the ABS. Nonetheless, downlink channels and downlink signals such as a Physical Broadcast Channel (PBCH), a Primary Synchronization Signal (PSS), and a Secondary Synchronization Signal (SSS) may be transmitted even in the ABS. ABS-with-MBSFN may mean a subframe in which even the CRS is not transmitted in the data region of the above-described ABS. As described above, silencing may be performed in units of a specific subframe, and information indicating whether silencing is performed is referred to as a silent subframe pattern.

In addition, a silent subframe described in the embodiments may be understood to be a subframe in which no signal is transmitted or a subframe in which a weak power signal is transmitted. Although the silent subframe is exemplarily set to a subframe in which no signal is transmitted for clarity of description, it should be noted that the principles of the present invention can also be applied to the case in which a weal power signal is transmitted at the silent subframe. In addition, the ABS may be substantially identical to the silent subframe unless otherwise mentioned.

FIG. 10 is a conceptual diagram illustrating exemplary inter-cell interference coordination.

FIG. 10 exemplarily shows inter-cell interference coordination between a MeNB and a HeNB. The UE served by the MeNB is denoted by MUE, and the UE served by the HeNB is denoted by HeNB. In the case in which the MUE is located in HeNB coverage but is not connected to the HeNB (e.g., if HeNB is a BS serving only a Closed Subscriber Group (CSG) and MUE is not contained in the corresponding CSG), the MUE receives strong interference from the HeNB due to DL transmission, such that it may have difficulty in receiving a DL signal from the MeNB.

As an example of inter-cell interference coordination between the MeNB and the HeNB, the HeNB may allocate some subframes (e.g., even-th subframes) to the ABS. Therefore, the HeNB may not transmit signals at the even-th subframes or may transmit a weak power signal at the even-th subframes, such that interference of the MUE is reduced and the MeNB may perform DL transmission for the MUE using the corresponding time resources.

Adaptive HARQ Process Configuration

One case in which carrier aggregation (CA) is configured and the other case in which inter-cell interference coordination is carried out have something in common with each other because the two cases are associated with a plurality of cells. In this case, some cases associated with carrier aggregation (CA) may use a plurality of cell resources in common, and this means that independent use of resources is limited at a specific cell from among coordinated cells. In addition, the use of some resources of the specific cell may be limited in the case of inter-cell interference coordination. Common points of the above situations indicate that resources (i.e., time and/or frequency resources) used in the specific cell are limited.

If 8 independent HARQ processes are configured for each cell according to the legacy HARQ process configuration scheme even when resources are limited, the HARQ process may not be actually used or may be unnecessary. In addition, total memory capacity of the UE is limited, and buffer capacity of the HARQ process to be actually used is reduced. Accordingly, HARQ efficiency may be decreased or the HARQ operation may be incorrectly carried out. In order to solve the above problems, the present invention proposes a method for adaptively configuring the HARQ process.

In order to adaptively configure the HARQ process, the BS may inform the UE of specific information regarding the number of HARQ processes to be configured, the HARQ process number to be configured, and the buffer size allocated to each HARQ process through signaling. The information signaled to the UE may be defined as explicit control information for HARQ process configuration (i.e., the number of HARQ processes and configuration regarding the buffer size), and may be defined as implicit control information suggested by other control information. Such signaling may be dynamically carried out through L1/L2 signaling, or may be semi-statically carried out through higher layer signaling. Alternatively, a predetermined rule associated with the relationship between the HARQ process configuration and the limited resources is predetermined, and the HARQ process configuration may be changed according to the corresponding rule without separate signaling.

The following description will disclose examples of the present invention showing the adaptive HARQ process configuration for use in carrier aggregation (CA), and will also disclose the adaptive HARQ process configuration for use in inter-cell interference coordination and band-swapping of the TDD system. The above-mentioned examples relate to a method for adaptively configuring the HARQ process when resources are commonly limited.

CoMP system using Carrier Aggregation (CA)

Figure 11:
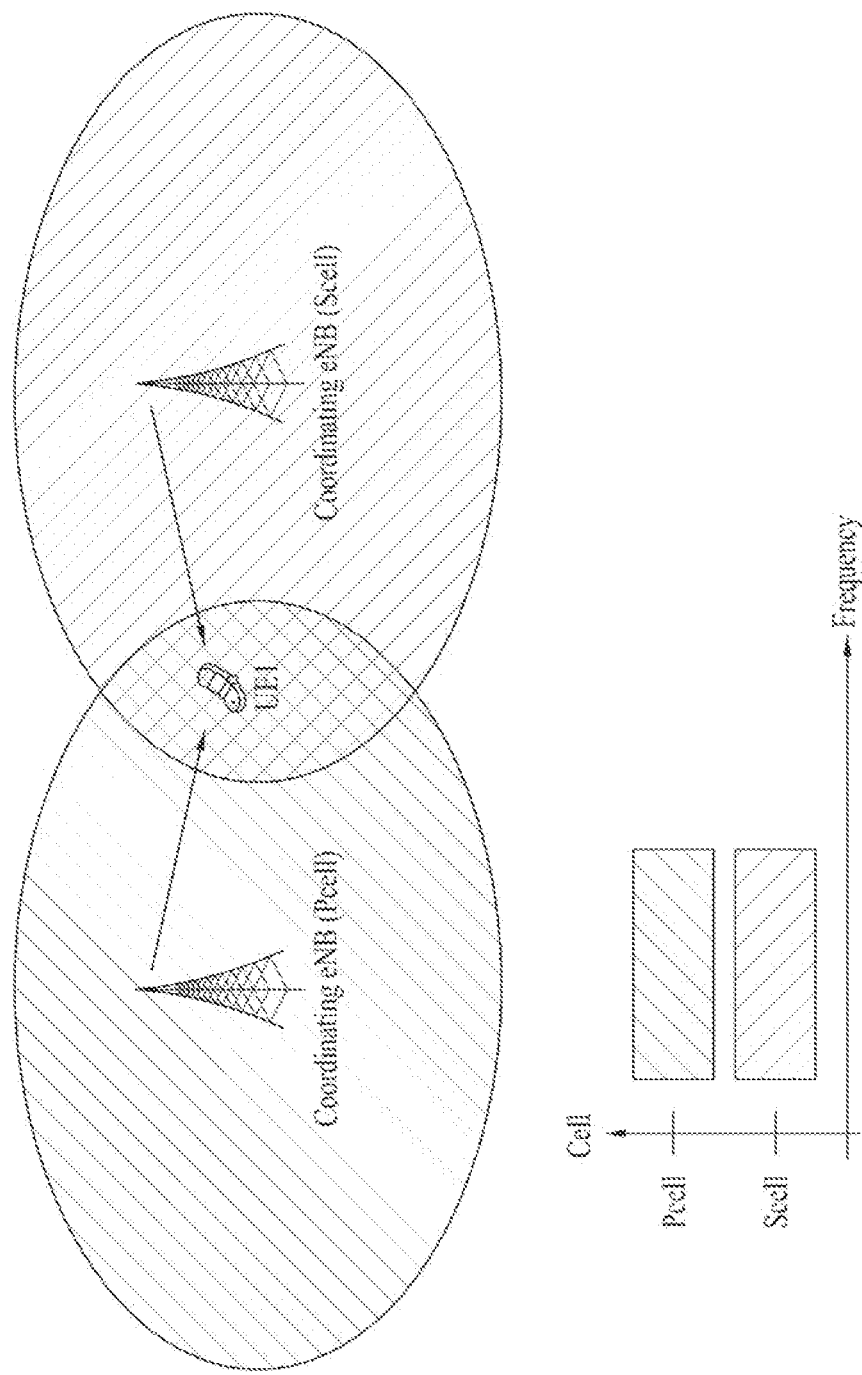
FIG. 11 is a conceptual diagram illustrating an exemplary CoMP system using carrier aggregation (CA).

The above-mentioned carrier aggregation (CA) environment may indicate that multiple cells are configured for each UE and a DL CoMP operation may be carried out using a plurality of cells configured for UE. FIG. 11 is a conceptual diagram illustrating an exemplary CoMP system using carrier aggregation (CA). PCell and SCell configured for one UE (UE1) shown in FIG. 11 may respectively correspond to a serving BS (or serving cell) and a coordinated BS (or a coordinated cell) of each CoMP operation. In this case, if PCell and SCell have different frequencies (i.e., a center frequency and a frequency band), this means a general carrier aggregation (CA) operation extending a total frequency band. However, PCell and SCell shown in FIG. 11 are configured to use the same frequency band, and correspond to two BSs geographically spaced apart from each other. The above-mentioned description may be understood as a special format of carrier aggregation (CA). Accordingly, PCell configured for UE1 is allocated to the serving cell, SCell is allocated to a neighbor cell causing interference, and various DL CoMP operations such as CoMP JT, CS/CB, dynamic cell selection, etc. can be carried out.

Figure 12:
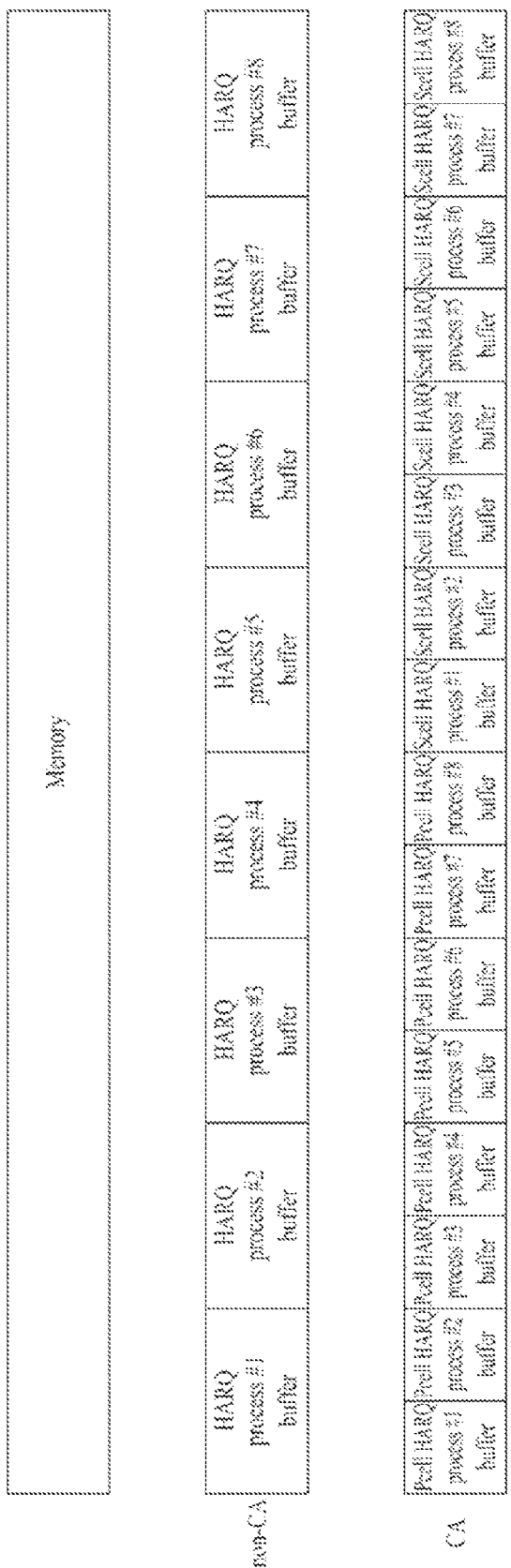
FIG. 12 is a conceptual diagram illustrating exemplary HARQ buffer allocation.

In the case of a general carrier aggregation (CA) (e.g., LTE-A system) in which multiple carriers having different frequencies (i.e., the center frequency and the frequency band) are aggregated to extend a total bandwidth, independent HARQ processes are respectively defined in several carriers (or cells). For example, 8 HARQ processes are allocated to PCell, 8 HARQ processes are allocated to SCell, and a buffer is allocated to each HARQ process. In this case, the buffer per HARQ process of the transmitter and/or the receiver is reduced in size. For example, the UE has a fixed-sized memory, and the corresponding memory is uniformly distributed for each HARQ process, and the buffer for each HARQ process may be allocated. FIG. 12 is a conceptual diagram illustrating HARQ buffer allocation. As shown in FIG. 12, the UE in which carrier aggregation (CA) is not configured manages 8 independent HARQ processes, such that a buffer corresponding to ⅛ of the memory size may be allocated to each HARQ process. On the contrary, the UE in which PCell and SCell are configured manages 16 HARQ processes, such that the buffer corresponding to ¹⁄₁₆ of the memory size may be allocated to each HARQ process.

In this case, although a high transfer rate on the system design is achieved using carrier aggregation (CA) and/or CoMP, if a reception buffer of the UE is not large in size in a manner that the reception buffer cannot sufficiently cope with the high transfer rate, buffer overflow occurs, such that it is difficult to correctly transmit and receive data. Therefore, a buffer size per HARQ process of the UE may limit system performance, and it may be difficult to actually achieve a high transfer rate expected by the system.

Figure 13:
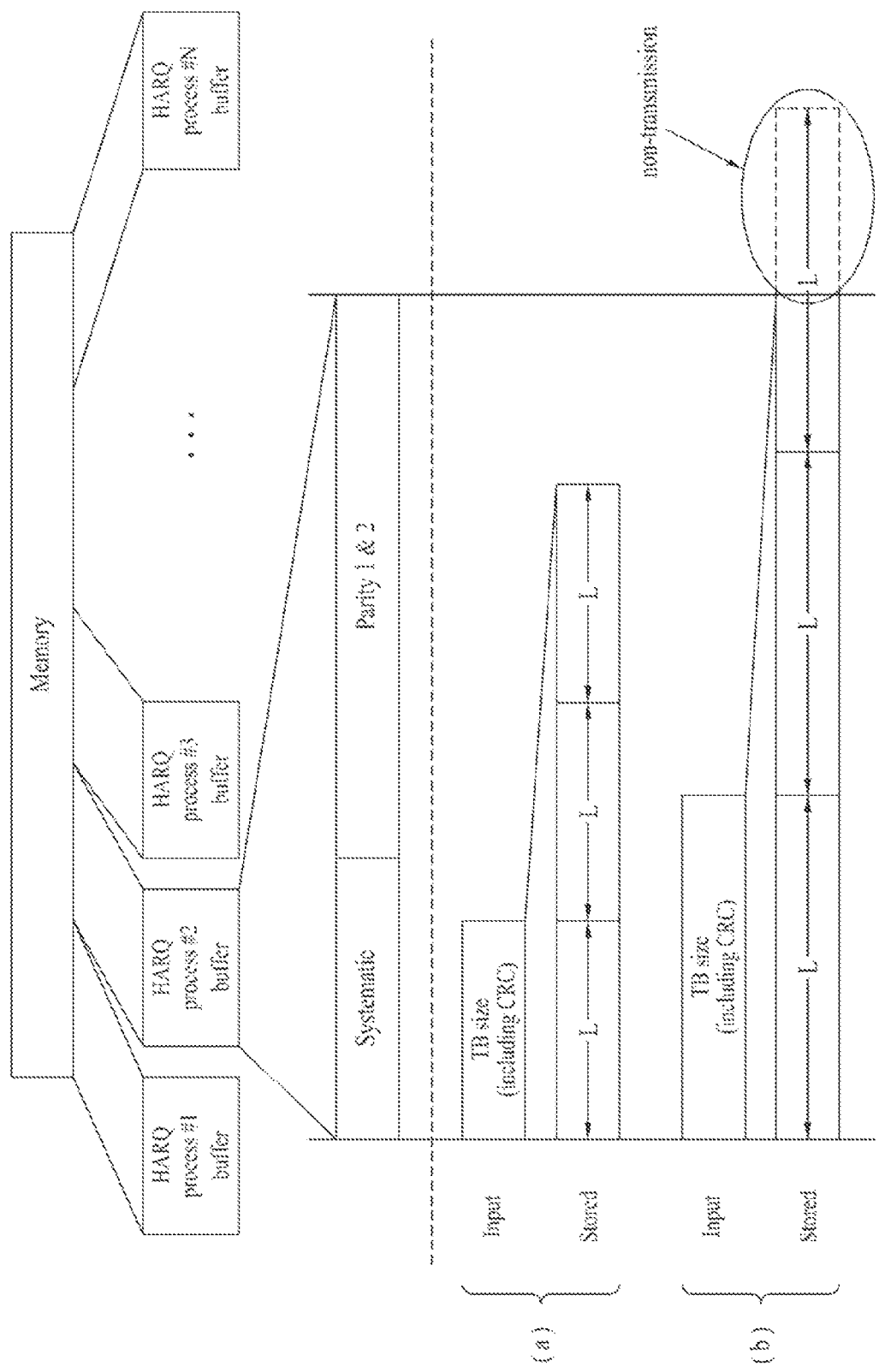
FIG. 13 exemplarily shows the result of comparison between a codeword size and a buffer size.

In addition, if the buffer size per HARQ process of the UE, HARQ performance or throughput may be deteriorated. FIG. 13 exemplarily shows the result of comparison between a codeword size and a buffer size. Referring to FIG. 13, it is assumed that the size of codewords capable of being maximally stored in a buffer (e.g., a buffer allocated to HARQ process #2 shown in FIG. 13) of one HARQ process corresponds to a systematic bit and parity bits 1 and 2. Data to be transmitted may be identified on a TB (Transfer Bit) basis, and the result of channel coding on TB is referred to as a codeword. The codeword may be comprised of a systematic bit and parity bit(s). The parity bit may be referred to as a redundancy bit, and may be used to correctly decode Tx data. As can be seen from FIG. 13, if a TB to which a TB CRC is attached has a length of L, the codeword size is denoted by 3L. FIG. 13(a) shows that the TB size is small and the size of codeword generated on the basis of the small TB is within HARQ buffer capacity. In this case, the HARQ operation can be carried out without any problem. On the contrary, FIG. 13(b) shows that the size of codewords generated on the basis of a large TB exceeds the HARQ buffer capacity. In this case, since some bits of the codewords are not basically stored in the HARQ buffer, the HARQ operation cannot be correctly carried out. In addition, the HARQ operation may include transmission/retransmission (Tx/Rx) based on codewords stored in the HARQ buffer. Although HARQ retransmission is repeatedly carried out due to bits (i.e., some parts of parity bits shown in FIG. 13) not stored in the HARQ buffer, the corresponding data may be incorrectly decoded. For example, FIG. 13(a) shows that the buffer size per HARQ process corresponds to ⅛ of the memory size under the condition that carrier aggregation (CA) is not configured, and FIG. 13(b) shows that CA is configured so that the buffer size per HARQ process corresponds to ¹⁄₁₆ of the memory size. In this case, although the same-sized codewords are used, the HARQ operation may be incorrectly carried out according to the number of HARQ processes or the buffer size per HARQ process.

Adaptive HARQ Process Configuration Associated Carrier Aggregation (CA)

In order to support the correct HARQ operation when carrier aggregation (CA) is configured, the present invention proposes a method for adaptively configuring the HARQ process. Accordingly, the HARQ inaccuracy or inefficiency caused by a limited buffer size per HARQ process can be reduced.

For example, if the CoMP system is configured using carrier aggregation (CA) as shown in FIG. 11, multiple cells are allocated to the same frequency, and perform coordination transmission to the UE on the same time resources. Therefore, the UE receives only one data from multiple cells using the same and frequency resources, such that the HARQ process per cell need not be defined.

Accordingly, according to the embodiments of the present invention, the HARQ process configuration/management scheme defined in the legacy carrier aggregation (CA) system is modified, such that only one HARQ process corresponding to a specific time resource is used for a plurality of cells configured to perform the CoMP operation, and only one HARQ buffer can be allocated to one HARQ process. For example, in the case of the JT or dynamic cell switching from among the CoMP operation, one HARQ process and one buffer may not be allocated to each of the cells used in a specific time resource, and one HARQ process and one buffer may be commonly assigned to the plurality of cells.

For example, it is assumed that a PCell and one SCell are configured for the UE for use in the legacy wireless communication system, the HARQ process and buffer for PCell is configured, and another HARQ process and buffer for SCell is configured. On this assumption, if PCell and SCell are used for CoMP, the HARQ process buffer of the PCell may be integrated with that of the SCell, and the HARQ process of the PCell may not be distinguished from the HARQ process of the SCell as necessary.

For this purpose, the BS may inform the UE of specific information indicating which cell will be used for CoMP. For example, if N Cells are configured for the UE, it may be assumed that M cells may be allocated for CoMP on the same frequency band and N-M cells may be allocated for other purposes (e.g., such cells are allocated to different frequency bands so that the bandwidth can be increased). In this case, in order to indicate cells used for CoMP by the BS, a signaling method for indicating one of $_NC_M$ cases may be used. For example, if two cells from among three cells is used for CoMP, the number of cases is set to 3, such that an indicator of 2 bits may be defined.

Figure 14:
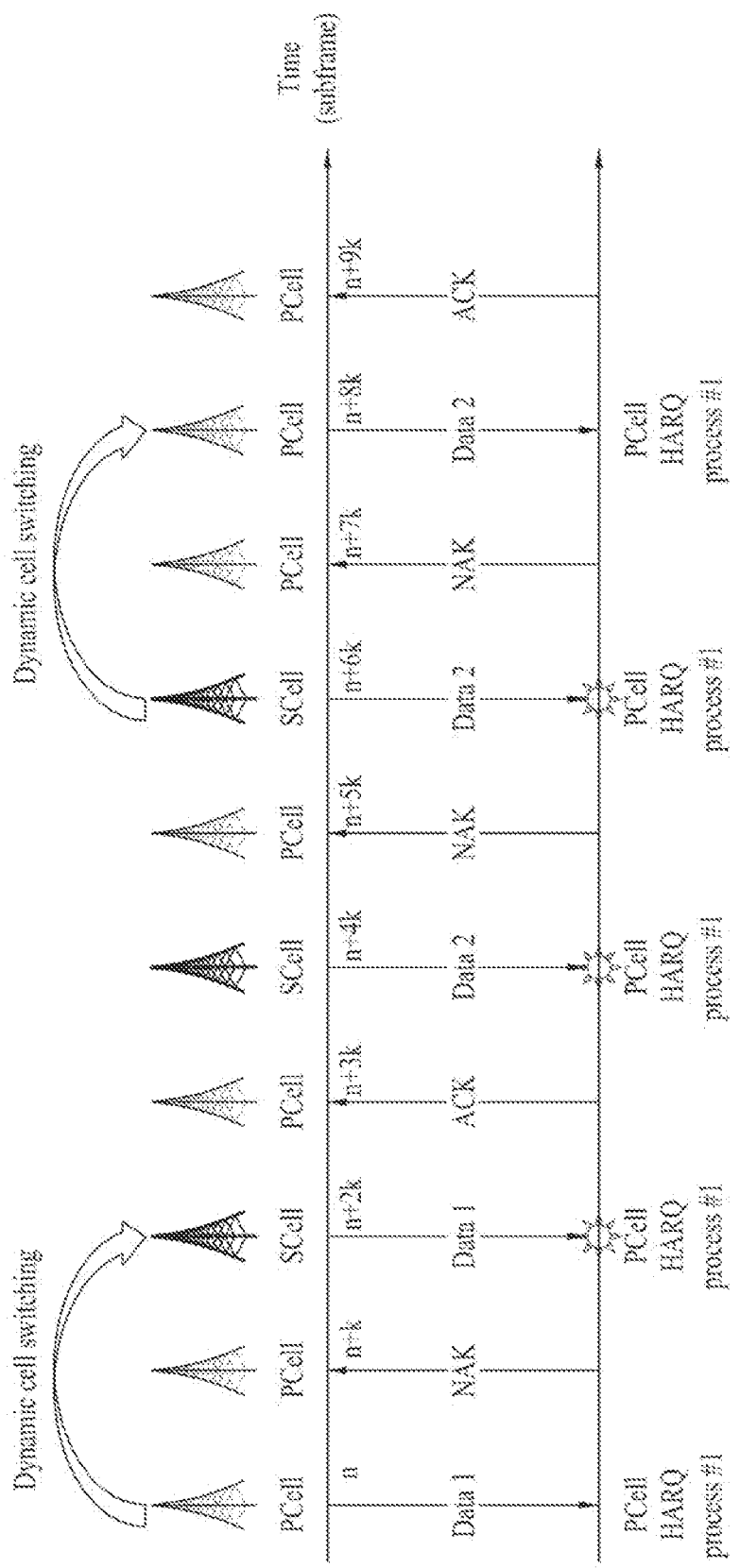
FIG. 14 is a conceptual diagram illustrating exemplary CoMP dynamic cell switching based on carrier aggregation (CA).

FIG. 14 is a conceptual diagram illustrating exemplary CoMP dynamic cell switching based on carrier aggregation (CA). The operations of subframes (n, n+k, . . . , n+9k) are shown in FIG. 14, where k is set to 4 as an example.

The UE may receive data of 1 on PCell at a subframe (n). It is assumed that the HARQ process associated with the subframe (n) is a PCell HARQ process #1. In this case, the PCell HARQ process #1 is commonly used at a subsequent subframe (n+2km) (m is a natural number) in association with PCell and SCell in which dynamic cell switching is carried out. Here, the above PCell HARQ process #1 may also be referred to as a common HARQ process #1 as necessary. That is, the present invention is not characterized in that which one of HARQ processes belonging to a certain cell will be used as the HARQ process, but is characterized in that one common HARQ process is associated with and used for the corresponding TTI.

If the UE fails to decode data '1', NACK may be transmitted through a PUCCH on PCell at a subframe (n+k). Thereafter, it is assumed that dynamic cell switching from PCell to Scell may be carried out according to change of a channel situation. In this case, as proposed by the present invention, PCell and SCell for use in the CoMP system share one HARQ process within one TTI, data '1' transmitted from the SCell is not processed through a new HARQ process at a subframe (n+2k), and is processed through the PCell HARQ process #1 at the subframe (n). If the UE succeeds in decoding the data '1' transmitted from the SCell, the UE may transmit the ACK message through a PUCCH of PCell at a subframe (n+3k). In this case, while the ACK message is transmitted to PCell, this means that dynamic switching from SCell to PCell is not carried out and the PUCCH is defined to be transmitted only on the PCell.

New data '2' is received through SCell at a subframe (n+4k) and this reception of the data '2' is processed through the PCell HARQ process #1 indicating a common HARQ process. The UE failed in decoding of data '2' may transmit the NACK message through a PUCCH of PCell at the subframe (n+5k), and the data '2' is retransmitted at the subframe (n+6k). Retransmission of data '2' at the subframe (n+6k) is also processed through the PCell HARQ process #1 indicating a common HARQ process. If the UE fails to decode the data '2' once more, NACK may be transmitted through PUCCH of PCell at the subframe (n+7k). Thereafter, a channel situation is changed so that dynamic cell switching from SCell to PCell is carried out. Accordingly, data '2' is received through PCell at a subframe (n+8k), and is processed through the PCell HARQ process #1. If the UE succeeds in decoding of data '2', ACK can be transmitted through a PUCCH of PCell at a subframe (n+9k).

Figure 15:
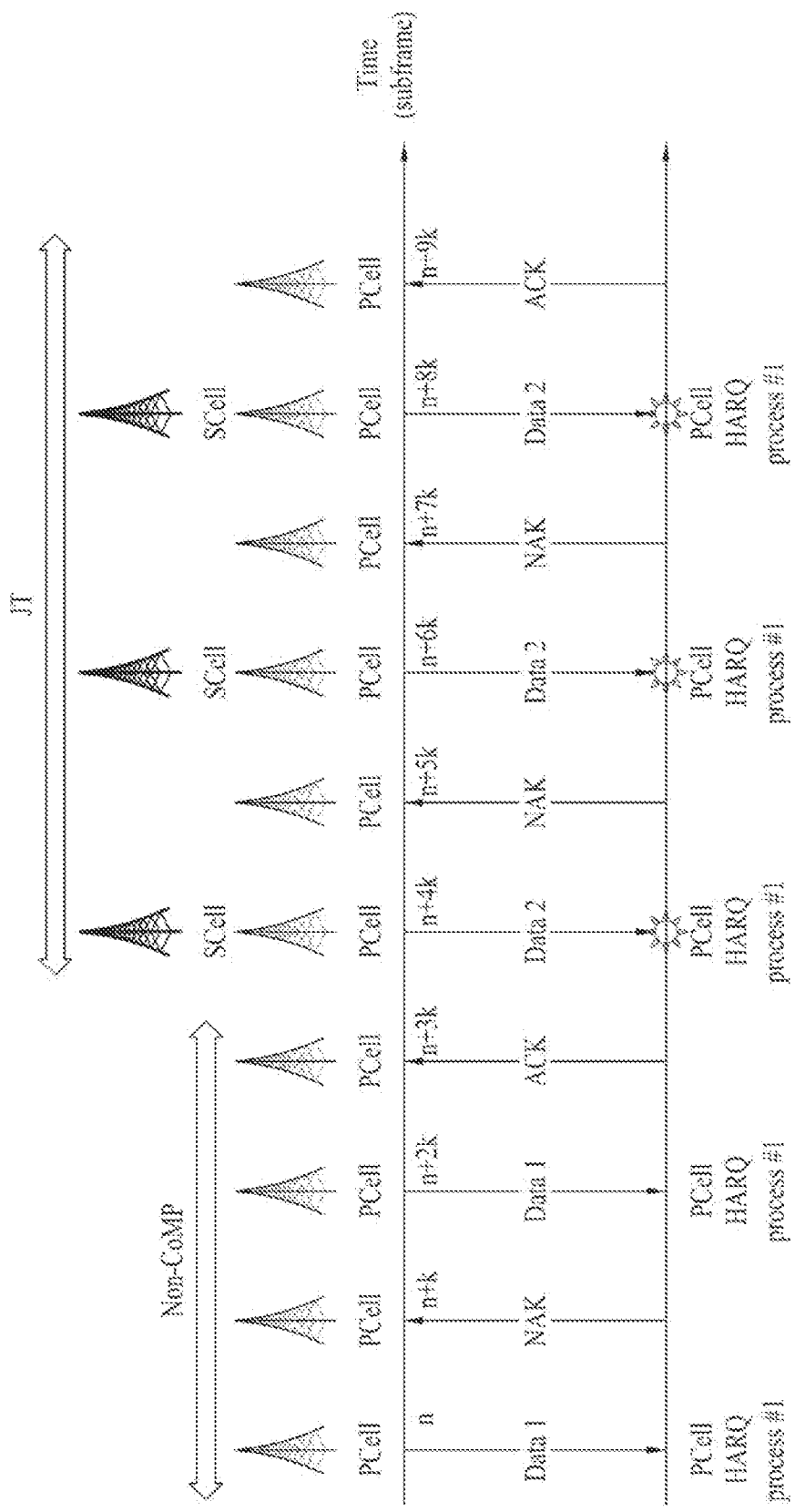
FIG. 15 is a conceptual diagram illustrating exemplary CoMP JT based on carrier aggregation (CA).

FIG. 15 is a conceptual diagram illustrating exemplary CoMP JT based on carrier aggregation (CA). FIG. 15 shows the operations of subframes (n, n+k, . . . , n+9k), where k is set to 4 as an example.

Referring to FIG. 15, PCell may transmit data '1' to the UE without coordination with other cells at the subframe (n). It is assumed that the HARQ process associated with the subframe (n) is the PCell HARQ process #1. In this case, although the CoMP JR is carried out in a subsequent process, a separate HARQ process for other cells (e.g., SCell) is not used, and the PCell HARQ process #1 is commonly used at the subframe (n+2km), where m is a natural number. If the UE fails to decode data '1', NACK may be transmitted through a PUCCH of PCell at the subframe (n+k). If retransmission of data '1' is carried out within PCell at the subframe (n+2k) and the UE succeeds in decoding, ACK may be transmitted through a PUCCH of PCell at the subframe (n+3k).

PCell and SCell may transmit the same data '2' to the UE at the subframe (n+4k). In this case, SCell can send data transmitted from PCell to the UE using the same resources (i.e., the same time and frequency resources) so as to increase a total transfer rate of the system, such that it is more desirable that the HARQ process for data transmitted on SCell is not separately configured and processes the data '2' acquired by JT transmission through the HARQ process of PCell. In addition, from the viewpoint of the UE, data '2' is not separately received after being discriminated between PCell and SCell, and data from PCell is combined with data from SCell such that the combined result is received as one signal, such that it is more desirable that the data '2' may be processed through a single HARQ process. Therefore, data '2' that has been JT-transmitted on PCell and SCell may be processed through PCell HARQ process #1 indicating a single common HARQ process.

The UE failed in decoding of data '2' may transmit the NACK message through a PUCCH of PCell at the subframe (n+5k), and may retransmit data '2' at the subframe (n+6k). Retransmission of data '2' at the subframe (n+6k) is carried out by JT of PCell and SCell, and is also processed through the PCell HARQ process #1 corresponding to a common HARQ process. If the UE fails to decode data '2' once more, NACK may be transmitted through a PUCCH of PCell at the subframe (n+7k). Accordingly, retransmission of data '2' may be carried out once more at the subframe (n+8k), and this retransmission may also be processed through the PCell HARQ process #1. If the UE succeeds in decoding of data '2', ACK may be transmitted through a PUCCH of PCell at the subframe (n+9k).

Figure 16:
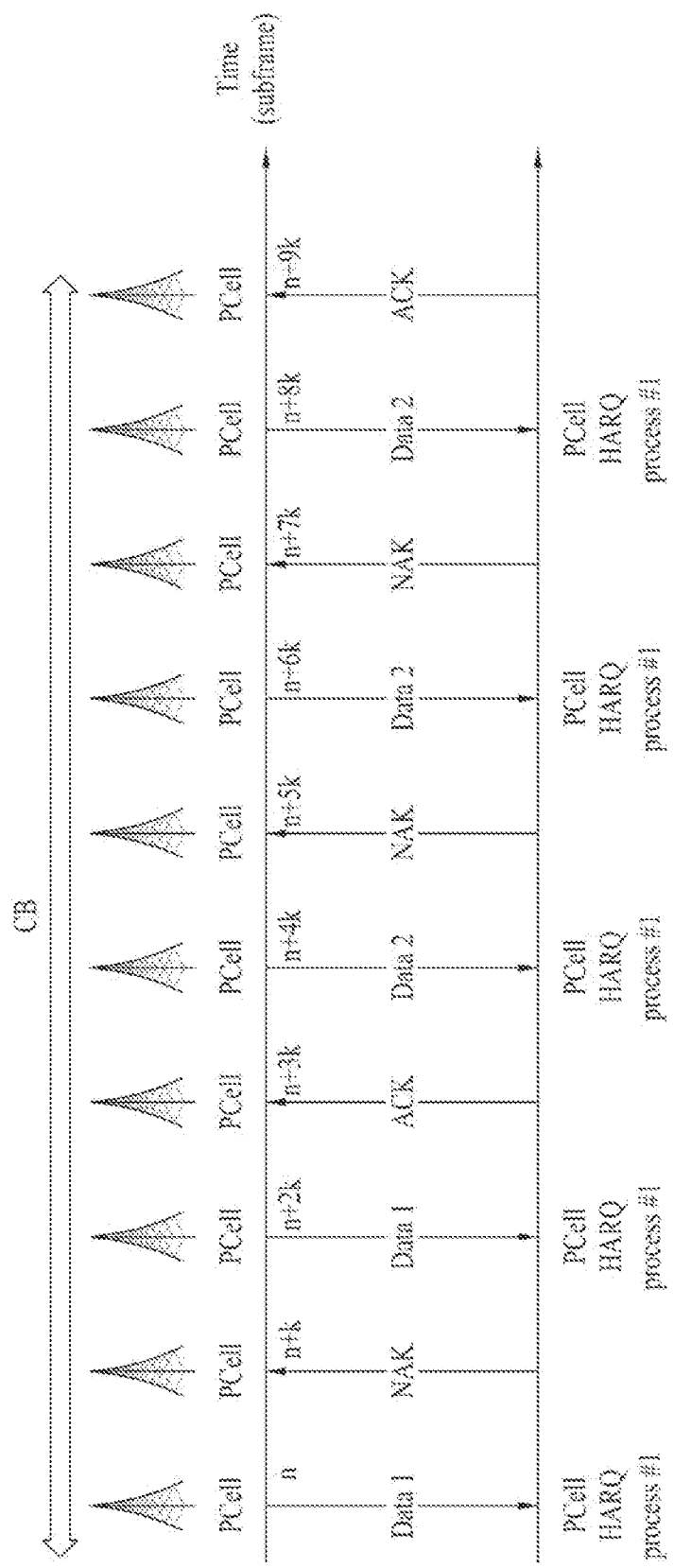
FIG. 16 is a conceptual diagram illustrating exemplary CoMP CB based on carrier aggregation (CA).

FIG. 16 is a conceptual diagram illustrating exemplary CoMP CB based on carrier aggregation (CA). If there is no limitation in resources, 8 HARQ processes are configured per cell in the same manner as in the legacy HARQ process configuration scheme as shown in FIG. 16. In accordance with the CoMP CB operation, other cells (e.g., SCell) participating in CoMP CB may decide a transmission (Tx) beam direction in a manner that no interference occurs in the CoMP UE served by PCell. In other words, the UE substantially receives data from PCell only, and PCell and SCell do not use common resources according to the CoMP operation, such that there is no limitation in independent resource configuration for each cell. In this case, the independent HARQ process may be configured per cell in the same manner as in the legacy HARQ process configuration.

As described above, the system to which CoMP JT or dynamic cell switching using carrier aggregation (CA) is applied enables a plurality of cells to share the same resources for transmission of only one data, such that it is not necessary to configure an independent HARQ process per cell, and buffer capacity is unavoidably reduced, resulting in reduction of total system performance. Therefore, the HARQ process is adaptively configured according to whether independent resource limitation is present per cell, such that the number of HARQ processes can be greatly reduced and system throughput can be improved as compared to the above method for configuring 8 independent HARQ processes per cell.

In addition, when the adaptive HARQ process is configured by the CoMP system based on carrier aggregation (CA), the buffer size per HARQ process may be unevenly configured. In association with the buffer size per HARQ process, high buffer capacity may be allocated to one case in which CoMP transmission related to the corresponding HARQ process has low transfer rate, and low buffer capacity may be allocated to the other case in which CoMP transmission related to the corresponding HARQ process has low transfer rate. For example, different data transfer rates may be required according to the CoMP schemes. In the case of JT scheme, a relatively high transfer rate may be required. On the contrary, in the case of dynamic cell switching, a relatively low transfer rate may be required as compared to the JT scheme. Accordingly, a buffer having relatively high capacity may be allocated to the HARQ process associated with the subframe in which the CoMP JT operation is configured, and a buffer having relatively low capacity may be allocated to the HARQ process associated with the subframe in which the CoMP dynamic cell switching or non-CoMP operation is configured. For this purpose, the BS or eNB may signal information regarding the buffer size per HARQ process to the UE.

Configuration of Adaptive HARQ Process Associated with Inter-Cell Interference

Similar to the above-mentioned carrier aggregation case, if the number of HARQ processes per cell is reduced even when time resources used by a specific cell are limited, system throughput or performance can be improved. The above case in which time resources used by the specific cell are limited may include another case in which some subframes are configured for the ABS so as to perform inter-cell interference (ICI) coordination with other cells.

For example, it is assumed that the number of subframes capable of being used by a specific cell from among one radio frame (i.e., 10 subframes) is limited to 5. In other words, 5 subframes of one radio frame may be configured for the specific cell (See HeNB subframe configuration shown in FIG. 10). In this case, although 8 HARQ processes are configured from the viewpoint of a UE served by the specific cell, some HARQ processes may not be used for reception of actual DL data. Allocating the buffer to a unused HARQ process may decrease the efficiency of memory capacity utilization and the HARQ throughput or performance. Therefore, more preferably, the number of HARQ processes is reduced in proportion to the reduced number of subframes capable of performing DL transmission. For example, assuming that the number of subframes capable of performing DL transmission is cut in half as shown in FIG. 10, only odd-th processes from among 8 HARQ processes may be maintained (or activated) and the remaining processes other than the odd-th processes may not be configured (or deactivated). Therefore, only four HARQ processes are configured for the UE, and the buffer size per HARQ process may be increased two times that of the 8 HARQ processes.

The above-mentioned example indicates that, when only some parts of 8 HARQ processes are activated, total buffer capacity including forfeited buffer size once was allocated to the deactivated HARQ process is evenly distributed to the activated HARQ processes. However, the scope of the present invention is not limited thereto, and buffer capacity may be unevenly distributed to the activated HARQ process (according to weight values). For example, some parts of the activated HARQ processes may be assigned high buffer capacity capable of achieving a high transfer rate, and only small buffer capacity may be additionally allocated to the remaining parts or the some parts of the activated HARQ processes may be configured to use only basic buffer capacity without additional allocation of the buffer capacity.

On the contrary, in association with inter-cell interference (ICI) reduction, the ABS may set Tx power to zero '0' and perform DL transmission at low Tx power. For example, assuming that DL Tx power of the subframe in which the ABS is not configured is set to P, the ABS may perform DL transmission at Tx power of 0.1 P. In this case, since 8 HARQ processes are used, deactivation of some HARQ processes may be improper. Therefore, the buffer having relatively low capacity may be allocated to the HARQ process corresponding to a subframe in which relatively low Tx power is configured, and the buffer having relatively high capacity may be allocated to the HARQ process corresponding to the subframe in which relatively high Tx power is configured. If necessary, the buffer having memory capacity lower than that of the basic buffer may be allocated to the HARQ process corresponding to the subframe of a low transfer rate. In conclusion, it may be appreciated that buffer capacity of substantial zero is allocated to the HARQ process corresponding to the subframe having Tx power or transfer rate of substantial zero. For this purpose, the BS or eNB may signal the buffer size per HARQ process to the UE.

Adaptive HARQ Process Configuration Associated with Band Swapping

The term 'band swapping' may indicate technology in which a DL subframe may be used for UL purpose and a UL subframe may be used for DL purpose in a TDD system in which DL and UL subframes are pre-configured. In this case, this means that limitation of resources capable of being allocated for DL (or UL) occurs, such that it is desirable that the adaptive HARQ process configuration may be applied.

For example, in the case of band swapping in which the DL subframe is used for UL purpose, this means that the number of available DL subframes is reduced. Therefore, some HARQ processes from among all DL HARQ processes are deactivated, and buffer capacity capable of being allocated to the deactivated HARQ processes may be evenly or unevenly allocated to the activated HARQ processes. Even when the UL subframe is used for DL purpose, some HARQ processes may be deactivated, and buffer capacity may be evenly or unevenly allocated to the activated HARQ processes.

For this purpose, the BS or eNB may inform the UE of a subframe in which resource usage will be changed by band swapping, and the number of activated HARQ processes may be implicitly signaled. Alternatively, the BS or eNB may inform the UE of the number of activated HARQ processes and the buffer size per HARQ process using higher layer signaling.

As described above, the adaptive HARQ process proposed by the present invention is applied to the case in which transmission (Tx) resources are limited, such that it can prevent the occurrence of a faulty HARQ operation and can efficiently perform the HARQ operation. For example, the case of Tx resource limitation may include a first case (i) in which the CoMP system is implemented using carrier aggregation (CA); a second case (ii) showing exemplary inter-cell interference (ICI) such as ABS introduction to a heterogeneous network; and a third case (iii) showing exemplary band swapping of a TDD system. The scope of the present invention is not limited thereto, and adaptive HARQ configuration may also be applied to various resource limitation cases according to the present invention. For adaptive HARQ configuration, the BS or eNB may configure or reconfigure a plurality of HARQ processes and HARQ buffers so as to implement adaptive HARQ configuration, and may inform the UE of the configured or reconfigured resultant information through signaling.

Figure 17:
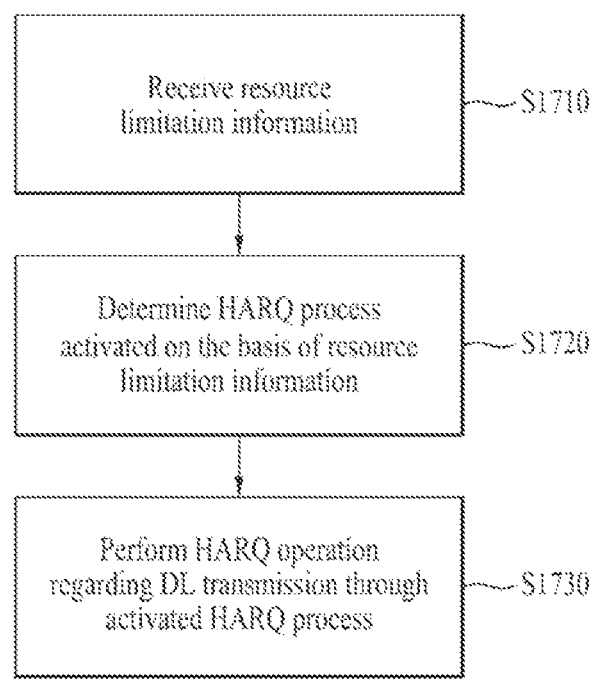
FIG. 17 is a flowchart illustrating an HARQ operation method according to one embodiment of the present invention.

FIG. 17 is a flowchart illustrating an HARQ operation method according to one embodiment of the present invention.

Referring to FIG. 17, the UE may receive resource limitation information from the BS or eNB in step S1710. In this case, if coordinated transmission is carried out by more than one cell configured for the UE, the above resource limitation information may correspond to information regarding the subframe and frequency band commonly used by the more than one cell. In this case, the above resource limitation information may correspond to specific information indicating resources, independent usage of which is limited by a specific cell from among coordinated cells. Alternatively, the resource limitation information may correspond to information regarding the subframe in which Tx power is adjusted or set to zero for ICI coordination. The above-mentioned case may indicate an exemplary case in which perfect use of some subframes from among all subframes capable of being used by the serving cell for ICI coordination is limited. Alternatively, the above-mentioned case may represent information of a subframe to which band swapping is applied. The above-mentioned case may indicate that subframes configured to be used according to original configuration are used for other bands due to band swapping so that the use of the subframes is limited.

In step S1720, the UE may decide the HARQ process to be activated on the basis of resource limitation information, and may not allocate the HARQ process to such limited resources, such that the HARQ process to be activated can be decided. For example, in the case of the CoMP operation based on carrier aggregation (CA), the HARQ process corresponding to resources commonly (simultaneously or alternately) used by coordinated cells can be activated, and the activated HARQ process may be an HARQ process commonly configured by the coordinated cells. In this case, the buffer size allocated to the activated HARQ process may be evenly or unevenly configured. In the case of uneven buffer allocation, buffer capacity may be decided on the basis of a weight considering either Tx power or transfer rate on resources associated with the activated HARQ process. For high Tx power or high transfer rate, a high-capacity buffer may be allocated generally. Meanwhile, the BS or eNB may explicitly signal not only identification (ID) information of the HARQ process to be activated through resource limitation information received at step S1710 but also buffer capacity information to the UE.

In step S1730, the UE may perform the HARQ operation using the activated HARQ process.

The above-mentioned HARQ operation shown in FIG. 17 may be implemented such that above described various embodiments of the present invention may be independently applied or two or more embodiments thereof may be simultaneously applied and a repeated description is omitted for clarity.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The above-mentioned embodiments can be applied to various mobile communication systems.

The invention claimed is:

1. A method for configuring a hybrid automatic repeat request (HARQ) process by a user equipment (UE) in a wireless communication system, the method comprising:
receiving, from a base station (BS), resource limitation information indicating resources the use of which is limited to downlink (DL) transmission toward the UE and indicating that data is to be received from multiple cells using a same frequency and same time resources;
activating a HARQ process of a plurality of HARQ processes based on the resource limitation information; and
performing an HARQ operation for the downlink transmission through the activated HARQ process,
wherein the activating comprises activating only one HARQ process of the plurality of HARQ processes and allocating only one HARQ buffer of a plurality of HARQ buffers to the only one activated HARQ process.

2. The method according to claim 1, wherein the resource limitation information is information regarding a subframe in which transmission (Tx) power is coordinated for inter-cell interference (ICI) coordination by a serving cell of the UE.

3. The method according to claim 2, wherein the subframe in which transmission (Tx) power is coordinated is an Almost Blank Subframe (ABS).

4. The method according to claim 1, wherein the resource limitation information is information regarding a subframe in which band swapping is performed.

5. The method according to claim 1, wherein the plurality of HARQ buffers comprise equal-sized buffers.

6. The method according to claim 1, wherein the plurality of HARQ buffers comprise unequal-sized buffers.

7. The method according to claim 1, wherein a capacity of the only one allocated HARQ buffer is determined based on a transmission (Tx) power or a transfer rate of resources associated with the only one HARQ process.

8. The method according to claim 1, wherein the HARQ process to be activated based on the resource limitation information is initially deactivated.

9. The method according to claim 1, wherein the resource limitation information further includes at least one of information for identifying the HARQ process to be activated, information regarding a number of the HARQ process to be activated, or a buffer capacity allocated to the HARQ process to be activated.

10. A user equipment (UE) for configuring a hybrid automatic repeat request (HARQ) process in a wireless communication system, comprising:
a transmitter configured to transmit an uplink signal to a base station (B S);
a receiver configured to receive a downlink signal from the base station (BS); and
a processor configured to control the UE including the transmitter and the receiver,
wherein the processor is further configured to:
receive, from the base station (BS), resource limitation information indicating resources the use of which is limited to downlink (DL) transmission toward the UE and indicating that data is to be received from multiple cells using a same frequency and same time resources,
activate a HARQ process of a plurality of HARQ processes based on the resource limitation information, and
perform an HARQ operation for the downlink transmission through the HARQ process.
wherein only one HARQ process of the plurality of HARQ processes is activated and only one HARQ buffer of a plurality of HARQ buffers is allocated to the only one activated HARQ process.

* * * * *